(12) United States Patent
Yanagimoto et al.

(10) Patent No.: US 6,195,215 B1
(45) Date of Patent: Feb. 27, 2001

(54) MEASUREMENT APPARATUS FOR USE IN RECORDING UNIT PROVIDED WITH CONTROL MEANS FOR CONTROLLING WRITE AND READ PARAMETERS

(75) Inventors: Yoshiyuki Yanagimoto; Hiroaki Ugawa; Atsushi Hattori; Nobuhiro Shitara, all of Hyogo (JP)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/124,535

(22) Filed: Jul. 29, 1998

(30) Foreign Application Priority Data

Aug. 5, 1997 (JP) .................................................. 9-210598

(51) Int. Cl.[7] ........................................................ G11B 5/02
(52) U.S. Cl. .................................. 360/25; 360/31; 360/46
(58) Field of Search .............................. 360/31, 25, 53, 360/46, 61, 51, 67, 68; 324/212, 226

(56) References Cited

U.S. PATENT DOCUMENTS 3,704,363 * 11/1972 Salmassy et al. .................. 360/31 X
5,134,366   7/1992 Kirk .
5,254,946  10/1993 Guzik .
5,822,139 * 10/1998 Ayabe .................................... 360/31

FOREIGN PATENT DOCUMENTS 5-6517   1/1993 (JP) .
6-84147  3/1994 (JP) .

* cited by examiner

*Primary Examiner*—Alan T. Faber

(57) ABSTRACT

The invention is directed toward a measuring apparatus for measuring performance characteristics of a recording unit including a recording medium on which one track is divided into a plurality of sectors. The measuring apparatus includes a writing means for writing a write signal with a write parameter, a first control means for changing the write parameter value for respective sectors, a reading means for reading out the write signal written by the writing means with a read parameter and measuring the read-out write signal as a read signal, and a second control means for controlling the read parameter so as to produce predetermined read parameter values for respective sectors.

17 Claims, 20 Drawing Sheets

First Preferred Embodiment

First Preferred Embodiment

Second Preferred Embodiment

Second Preferred Embodiment

Third Preferred Embodiment

Third Preferred Embodiment

Third Preferred Embodiment

Third Preferred Embodiment

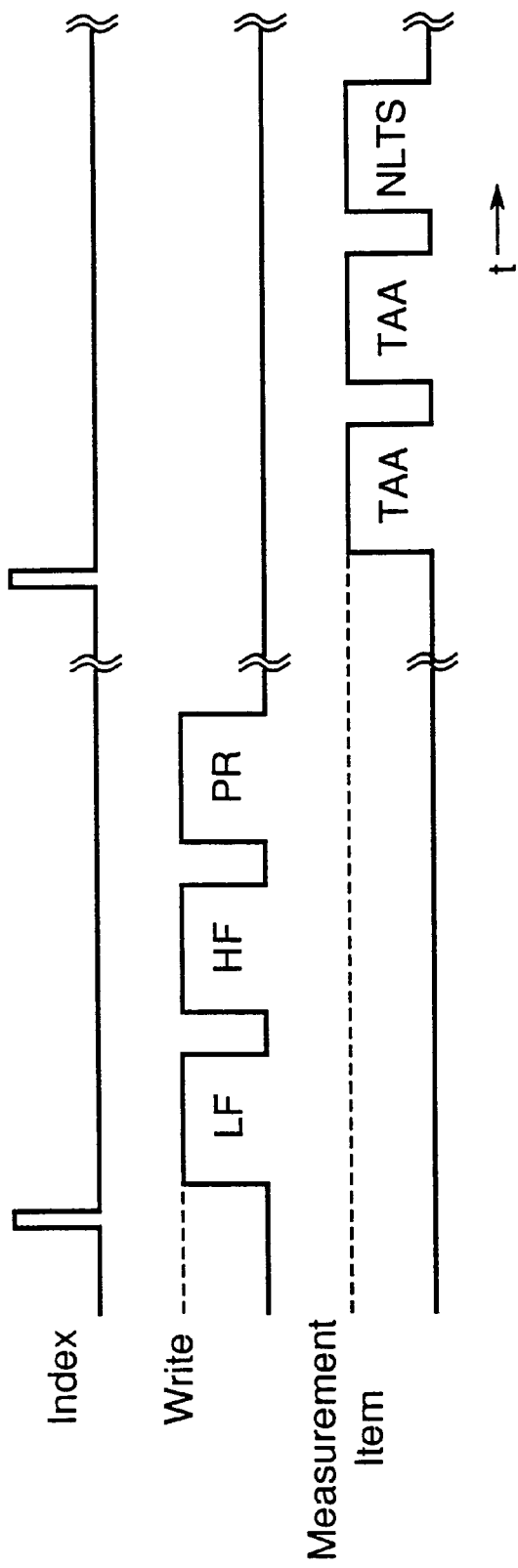
Fig.24 Fourth Preferred Embodiment

Modified Preferred Embodiment

MEASUREMENT APPARATUS FOR USE IN RECORDING UNIT PROVIDED WITH CONTROL MEANS FOR CONTROLLING WRITE AND READ PARAMETERS

BACKGROUND OF THE INVENTION

1. Field of the Invention

The present invention relates to a measuring apparatus for use in a recording unit, in particular, to a measuring apparatus for measuring performance characteristics of a recording unit including a recording medium of a hard disk, a floppy disk, or an optical disk such as CD, DVD, a magneto-optical disk (of ROM, write once type, rewriting type) or the like and components such as a head for recording a data signal on the above recording medium and the like.

2. Description of the Prior Art

Upon testing either a fixed type magnetism fixture magnetic disk drive unit (referred to as a hard disk unit hereinafter) for driving a hard disk, the above hard disk, or a magnetic head, there is the practice of evaluating the performance characteristics of the above hard disk, the testing process includes the following steps:

(a) inserting a spindle into a center hole of the hard disk and supporting the magnetic head so as to electromagnetically couple the magnetic head with the surface of the hard disk in a non-contact manner;

(b) executing either a data writing process or a data reading process on the hard disk by means of the magnetic head while rotating the spindle by means of a spindle motor; and (c) evaluating the performance characteristics of the hard disk unit including the hard disk.

As performance evaluation items, the following ones can be enumerated. The performance evaluation items includes the followings:

(a) a track average signal amplitude (Track Averaged Amplitude: referred to as a TAA hereinafter);

(b) an asymmetry of a signal amplitude;

(c) a pulse width (PW);

(d) an asymmetry of a pulse width;

(e) a base line;

(f) a non-linear type bit shift amount (Non-linear Transition bit shift: NLTS);

(g) an overwrite characteristic (OverWrite: OW);

(h) a bit error rate (Bit Error Rate: BER);

(i) a margin, and so on.

The evaluation items of the TAA for a read signal from the hard disk are shown in FIG. 10.

When evaluating the performance of a hard disk, it is required to set parameters for measurement, and the parameters includes the followings:

(a) a position of a magnetic head (referred to as a head position hereinafter);

(b) a head angle (skew);

(c) a spindle rotation speed;

(d) a signal frequency;

(e) a write data pattern;

(f) a write current amount;

(g) a write compensation amount (concretely, a amount of compensation for compensating for the write change timing);

(h) an MR (Magnetic Resistance) head bias current, and so on.

In this case, the signal frequency, the write data pattern, the write current amount, the write compensation amount, the head position and the MR head bias current are write parameters for the hard disk, while the head position, the head angle and the MR head bias current are read parameters for the hard disk.

A procedure in measuring the above evaluation items has a sequence of parameter setting, writing onto a disk, reading out and evaluating the characteristics of the read signal. FIG. 11 shows signal waveforms of a write signal and a read signal. Conventionally, it has been a common practice to obtain a parameter dependency of the measured values of the evaluation items by changing set values of the above-mentioned parameters in small steps and repetitively executing a similar measurement.

For example, FIG. 12 shows a dependency of the TAA on a write current amount Iw. According to the conventional technique, such a measurement has been executed by writing data with fixed one parameter for one rotation of the disk when the spindle is rotated by one turn, and reading out the written data during another turn, thereby obtaining the measurement data for one point in FIG. 12. By repeating this sequence a plurality of times while changing the parameter, a graph as shown in FIG. 12 is obtained according to the measuring method based on the conventional technique (referred to as a first prior art hereinafter). That is, according to the conventional technique, one parameter has been set per one revolution of the track.

There is sometimes such a case that the state of a read element is disadvantageously changed by a magnetic field in the writing stage, then consequently, this leads to an unstable characteristic (referred to as instability hereinafter). This phenomenon may be a kind that occurs only once per several times or another kind that occurs as a variation every measurement. Therefore, in measuring such a characteristic, it is a common practice to repeat the write and read operations many times, and then statistically evaluate the measured values of read signals. When measuring the above-mentioned instability by a conventional technique (referred to as a second prior art hereinafter), statistic data including the average value and the variance of the measured value data are obtained, as shown in FIG. 13, by executing a plurality of times, a process including the steps of, first of all, writing desired data on the whole track of the disk, writing data which will be abandoned for a part of the track, and thereafter reading out the data on the rest of the track.

The above-mentioned prior art measuring method and measuring apparatus have had such a problem that the measuring time is relatively long.

Furthermore, when executing the measurement by switching the measurement item upon evaluating the performance characteristics of a hard disk, it takes much measuring time according to the prior art methods in an attempt at viewing the influences on the parameters requiring a significantly long time for convergence. As the parameters requiring a significantly long time for convergence, there can be enumerated the frequency, the head position and so on. For example, FIG. 21 shows a relationship between the head position and the read signal amplitude, where the relationship is called the track profile. Such a measurement (referred to as a third prior art hereinafter) takes a long time for moving the head position as compared with that of the rotation of the spindle, and this leads to such a problem that the measuring time is elongated.

SUMMARY OF THE INVENTION

An essential object of the present invention is therefore to provide a measuring apparatus for use in a recording unit, capable of measuring the performance characteristics of a recording unit including a recording medium at a higher speed than that of the prior arts.

In order to achieve the above-mentioned objective, according to one aspect of the present invention, there is provided a measuring apparatus for use in a -recording unit, for measuring performance characteristics of said recording unit including a recording medium on which one track is divided into a plurality of sectors, said measuring apparatus comprising:

writing means for writing a write signal with a write parameter value changed for respective sectors; and reading means for reading out the write signal written by said writing means, with predetermined read parameters for respective sectors, and measuring the read-out write signal as a read signal.

According to another aspect of the present invention, there is provided a measuring apparatus for use in a recording unit, for measuring performance characteristics of said recording unit including a recording medium on which one track is divided into a plurality of sectors, said measuring apparatus comprising:

writing means for writing a write signal with predetermined write parameters for respective sectors; and reading means for reading out the write signal written by said writing means, with read parameter values changed for respective sectors, and measuring the read-out write signal as a read signal.

According to a further aspect of the present invention, there is provided a measuring apparatus for use in a recording unit, for measuring performance characteristics of said recording unit including a recording medium on which one track is divided into a plurality of sectors, said measuring apparatus comprising:

first writing means for writing a write signal with a predetermined write parameter for respective sectors;

first reading means for reading out the write signal written by said first writing means, with predetermined read parameters for respective sectors, and measuring the read-out write signal as a reference read signal;

second writing means for writing a write signal with a write parameter value changed for respective sectors;

second reading means for reading out the write signal written by said second writing means, with predetermined read parameters for respective sectors, and measuring the read-out write signal as a measured read signal; and correctively calculating means for correctively calculating the measured read signal measured by said second reading means, according to a predetermined correctively calculating method based on the reference read signal measured by said first reading means, and outputting a correctively calculated measured read signal.

According to a still further aspect of the present invention, there is provided a measuring apparatus for use in a recording unit, for measuring performance characteristics of said recording unit including a recording medium on which one track is divided into a plurality of sectors, said measuring apparatus comprising:

first writing means for writing a write signal with predetermined write parameters for respective sectors;

first reading means for reading out the write signal written by said first writing means, with predetermined read parameters for respective sectors, and measuring the read-out write signal as a reference read signal;

second reading means for reading out the write signal written by said first writing means, with a read parameter value changed for respective sectors, and measuring the read-out write signal as a measured read signal; and correctively calculating means for correctively calculating the measured read signal measured by said second reading means, according to a predetermined correctively calculating method based on the reference read signal measured by said first reading means, and outputting a correctively calculated measured read signal.

According to a still more further aspect of the present invention, there is provided a measuring apparatus for use in a recording unit, for measuring performance characteristics of said recording unit including a recording medium on which one track is divided into a plurality of sectors, said measuring apparatus comprising:

measuring means for measuring a read-out write signal as a read signal by, for respective sectors, writing a write signal and thereafter reading out a written write signal.

According to a further aspect of the present invention, there is provided a measuring apparatus for use in a recording unit, for measuring performance characteristics of said recording unit including a recording medium having at least one track, said measuring apparatus comprising:

writing means for writing a write signal while continuously changing a write parameter for one track; and reading means for reading-out the write signal written by said writing means, with a predetermined read parameter, and measuring the read-out write signal as a read signal.

According to a still further aspect of the present invention, there is provided a measuring apparatus for use in a recording unit, for measuring performance characteristics of said recording unit including a recording medium having at least one track, said measuring apparatus comprising:

writing means for writing a write signal with a predetermined write parameter for one track; and reading means for reading out the write signal written by said writing means while continuously changing a read parameter for one track, and measuring the read-out write signal as a read signal.

According to a still more further aspect of the present invention, there is provided a measuring apparatus for use in a recording unit, for measuring performance characteristics of said recording unit including a recording medium having at least one track, said measuring apparatus comprising:

first writing means for writing a write signal with a fixed write parameter for one track;

first reading means for reading out the write signal written by said first writing means, with a predetermined read parameter and measuring the read-out write signal as a reference read signal;

second writing means for writing a write signal while continuously changing a write parameter for one track;

second reading means for reading out the write signal written by said second writing means, with a predetermined read parameter, and measuring the read-out write signal as a measured read signal; and correctively calculating means for correctively calculating the measured read signal measured by said second reading means, according to a predetermined correctively calculating method based on the reference read signal measured by said first reading means, and outputting a correctively calculated measured read signal.

According to a more still further aspect of the present invention, there is provided a measuring apparatus for use in a recording unit, for measuring performance characteristics of said recording unit including a recording medium having at least one track, said measuring apparatus comprising:

first writing means for writing a write signal with a fixed write parameter for one track;

first reading means for reading out the write signal written by said first writing means, with a predetermined read parameter and measuring the read-out write signal as a reference read signal;

second reading means for reading out the write signal written by said first writing means while continuously changing a read parameter for one track, and measuring the read-out write signal as a measured read signal; and correctively calculating means for correctively calculating the measured read signal measured by said second reading means according to a predetermined correctively calculating method based on the reference read signal measured by said first reading means, and outputting a correctively calculated measured read signal.

According to a further aspect of the present invention, there is provided a measuring apparatus for use in a recording unit, for measuring performance characteristics of said recording unit including a recording medium on which one track is divided into a plurality of sectors, said measuring apparatus comprising:

writing means for writing a write signal with a write parameter of an item changed for respective sectors; and reading means for reading out the write signal written by said writing means, with a predetermined read parameter for respective sectors, and measuring the read-out write signal as a read signal.

According to a still further aspect of the present invention, there is provided a measuring apparatus for use in a recording unit, for measuring performance characteristics of said recording unit including a recording medium on which one track is divided into a plurality of sectors, said measuring apparatus comprising:

trigger generating means, in response to an index signal generated every one turn of said recording medium, for outputting or not outputting one index trigger signal, or for multiplying the index signal, generating and outputting or not outputting a plurality of sector trigger signals corresponding to the plurality of sectors; and at least one control means, in response to either the index trigger signal or the plurality of sector trigger signals outputted from said trigger generating means, for executing either one of a process of writing a write signal and a process of reading out the write signal.

According to a still more further aspect of the present invention, there is provided a measuring apparatus for use in a recording unit, for measuring performance characteristics of said recording unit including a recording medium on which one track is divided into a plurality of sectors, said measuring apparatus comprising:

at least one control means having first and second input ports and switching means, wherein said switch means switches over between an index signal generated every one turn of said recording medium and a plurality of sector trigger signals generated so as to correspond to the plurality of sectors based on the index signal, and selectively outputs or does not output a switched signal, wherein the index signal is inputted to said first input port, and a signal outputted from said switch means is inputted to said second input port, and wherein said control means controls the selective switching of said switching means based on the index signal inputted to said first input port, and executes either one of a process of writing a write signal or a process of reading out the write signal based on the signal inputted to said second input port.

According to the present invention, the performance characteristics of the recording medium can be measured at a higher speed than that of the prior art.

Further, when the correctively calculating means is further provided in the above-mentioned measuring apparatus, the measured value can be properly corrected and more correct measured value can be obtained.

Further, when the statistically calculating means is further provided in the above-mentioned measuring apparatus, statistically processing the measured value can be properly performed and more correct measured value can be obtained. Furthermore, there can be obtained calculation results of the statistical processing in which the evaluation of the variation in the calculation results thereof is influenced by the average value for respective sectors.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 23A is a graph showing a TAA reference value Tar relative to the disk position, FIG. 23B is a graph showing a TAA measured value Tam relative to the head position, and FIG. 23C is a graph showing a TAA compensation value Tac relative to the head position;

FIG. 24 is a timing chart showing an example of different measurements during one revolution of a disk according to an instability measuring method according to a fourth preferred embodiment.

DETAILED DESCRIPTION OF THE PREFERRED EMBODIMENTS

Preferred embodiments according to the present invention will be described below with reference to the attached drawings.

A measuring apparatus for a recording unit including a recording medium of a hard disk and components such as a magnetic head for recording a data signal on the above recording medium according to a preferred embodiment of the present invention will be described below with reference to the drawings.

First Preferred Embodiment

Figure 14:
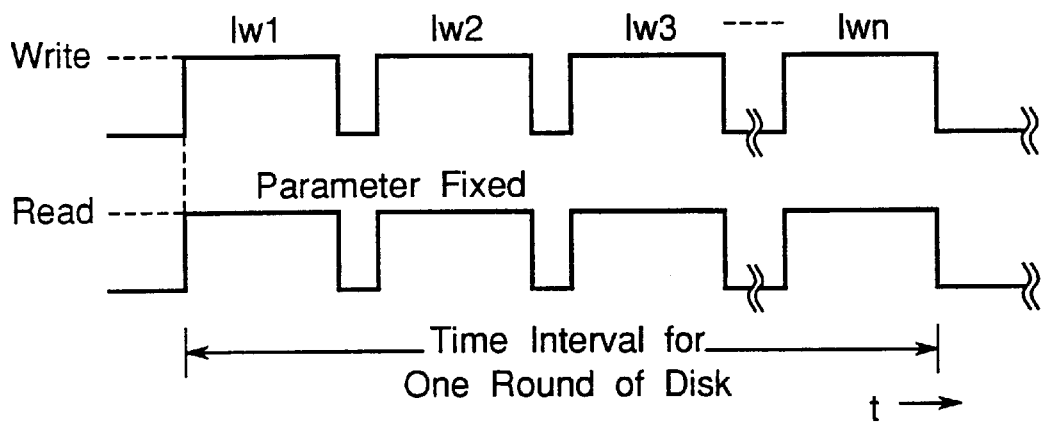
FIG. 14 is a timing chart showing a first example of write and read according to the measuring method of a first preferred embodiment.
Figure 15:
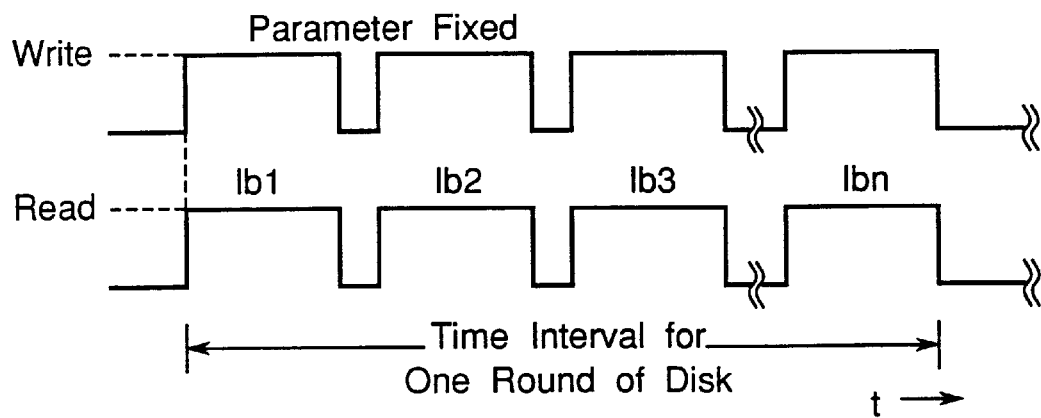
FIG. 15 is a timing chart showing a second example of write and read according to the measuring method of the first preferred embodiment.
Figure 17:
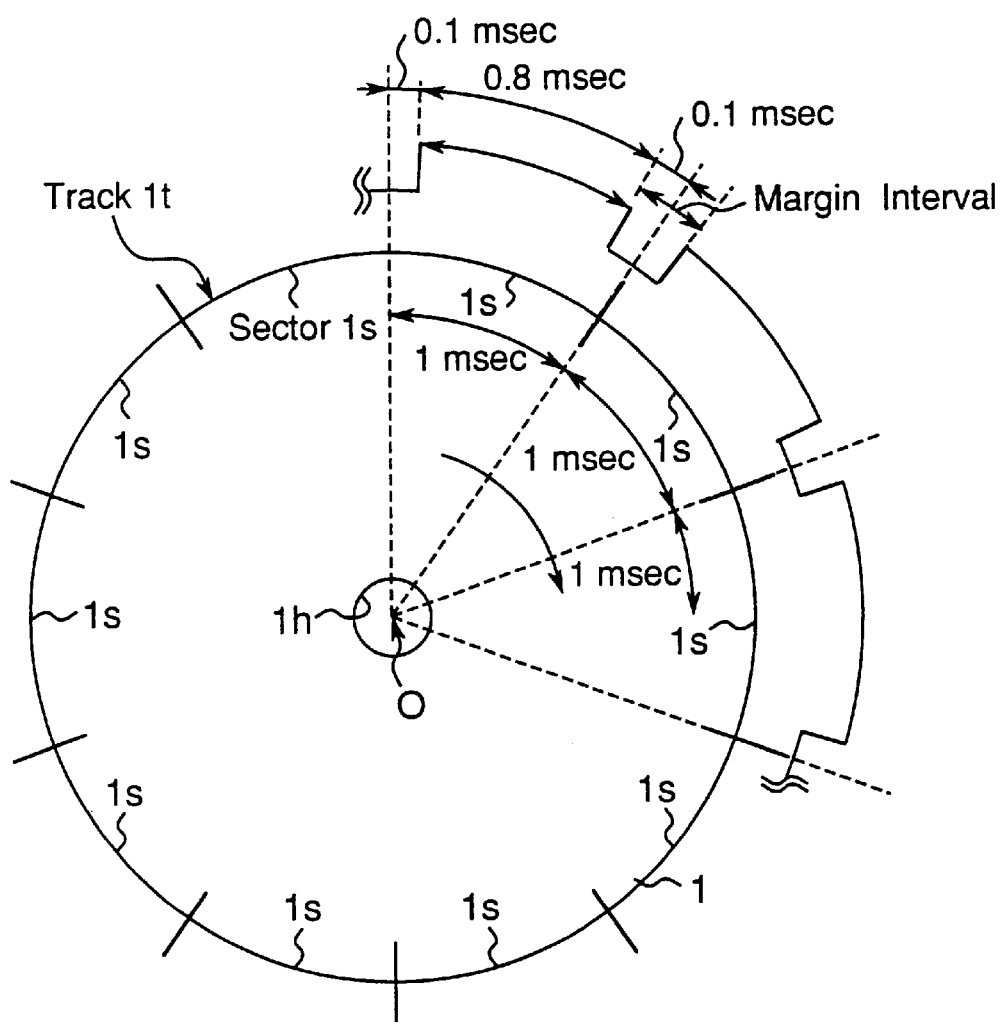
FIG. 17 is a plan view showing a process on a track of the hard disk according to the operation example of FIG. 16.

The measuring apparatus for use in the recording unit according to a first preferred embodiment of the present invention is characterized in that, as shown in FIG. 17, a higher-speed measurement than that of the prior arts is achieved by dividing one track $1t$ on a hard disk into, for example, ten sectors $1s$ and executing a measurement with a parameter value changed for respective sectors $1s$, i.e., executing a measurement so that one measurement is completed for each sector $1s$. Upon measuring the dependency characteristic of each performance evaluating item when the parameter value is changed, a write parameter (e.g., a write current Iw) is changed for respective sectors in a time interval for one revolution of the disk with the read parameter value fixed as shown in FIG. 14 or a read parameter (e.g., MR head bias current Ib) is changed with the write parameter value fixed as shown in FIG. 15.

Furthermore, due to such an arrangement that the sectors are arranged in different physical positions in the hard disk, a non-uniformity of the characteristics of the hard disk causes an error in the measured value. For the purpose of compensating for this, a more correct measured value can be obtained by using the measured value obtained with the fixed parameter for respective sectors (where the fixed parameter is the write parameter or the read parameter) as a reference value or a reference signal, and correcting a measured value obtained with the parameter changed for respective sectors (where the parameter to be changed is the read parameter or the write parameter) through collating or checking the measured value with the above reference value.

That is, concretely speaking, a write signal is written with a write parameter fixed for respective sectors, and thereafter, the write signal is read out with a read parameter fixed for respective sectors to measure the read-out signal as a reference read signal having a reference value. In order to measure the read-out signal as a reference read signal having a reference value, next, the write signal is written with a write parameter value changed for respective sectors, and thereafter, the write signal is read out with the read parameter fixed for respective sectors. Thereafter, correction is executed by a predetermined correcting method based on the reference read signal having the reference value and the measured read signal having the-measured value, then, the measured value obtained after the correction, namely, the corrected value is calculated by a main controller 20 and is outputted to a CRT display 22 or a printer 23 (See FIG. 1).

Otherwise, the write signal is written with a write parameter fixed for respective sectors, and thereafter, the write signal is read out with a read parameter fixed for respective sectors to measure the read-out signal as a reference read signal having a reference value. Next, the write signal is read out with a read parameter value changed for respective sectors. Then, correction is executed by a predetermined correcting method based on the reference read signal having the reference value and the measured read signal having the measured value, and the measured value obtained after the correction, namely, the corrected value is calculated by the main controller 20, and then, is outputted to the CRT display 22 or the printer 23 (See FIG. 1).

As a method for calculating the measured value obtained after the correction, as shown in Table 1, there is a method of executing a division calculation which is dividing the reference value measured with the fixed parameter by the measured value, and using the result of the division calculation as a corrected measured value. However, the calculating formula of the present invention is not limited to this.

TABLE 1

| Sector No. | 1 | 2 | 3 | 4 | . . . | N |
|---|---|---|---|---|---|---|
| Reference Value | $R_1$ | $R_2$ | $R_3$ | $R_4$ | . . . | $R_N$ |
| Measured Value | $M_1$ | $M_2$ | $M_3$ | $M_4$ | . . . | $M_N$ |
| Measured Value After Correction | $M_1/R_1$ | $M_2/R_2$ | $M_3/R_3$ | $M_4/R_4$ | . . . | $M_N/R_N$ |

Figure 1:
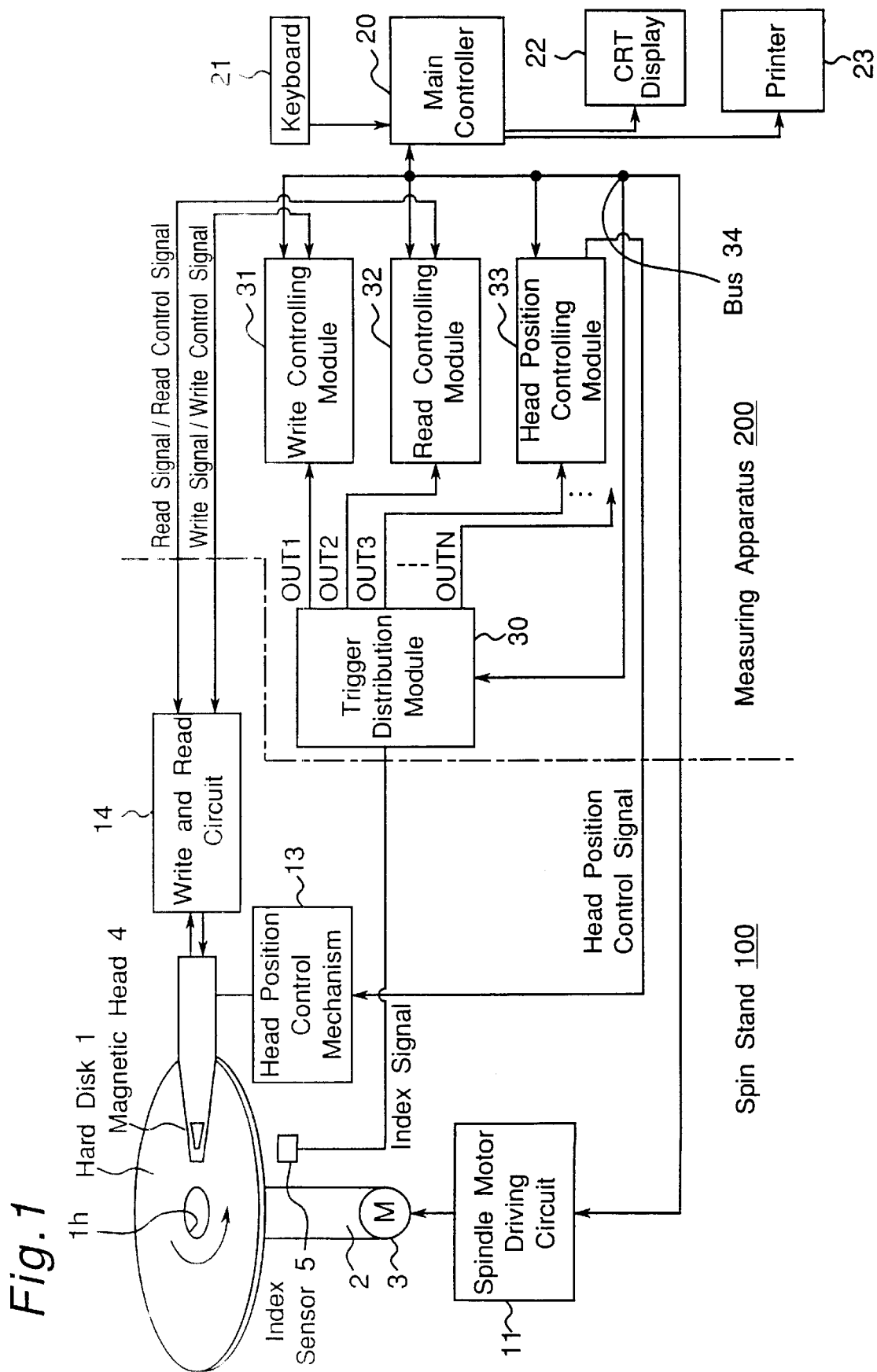
FIG. 1 is a block diagram showing a construction of a spin stand 100 and a measuring apparatus 200 for use in the spin stand 100 according to a preferred embodiment of the present invention.

FIG. 1 is a block diagram showing a construction of a spin stand 100 and a measuring apparatus 200 for the spin stand 100 according to a preferred embodiment of the present invention. The measuring apparatus 200 shown in FIG. 1 is constructed as follows.

Figure 6:
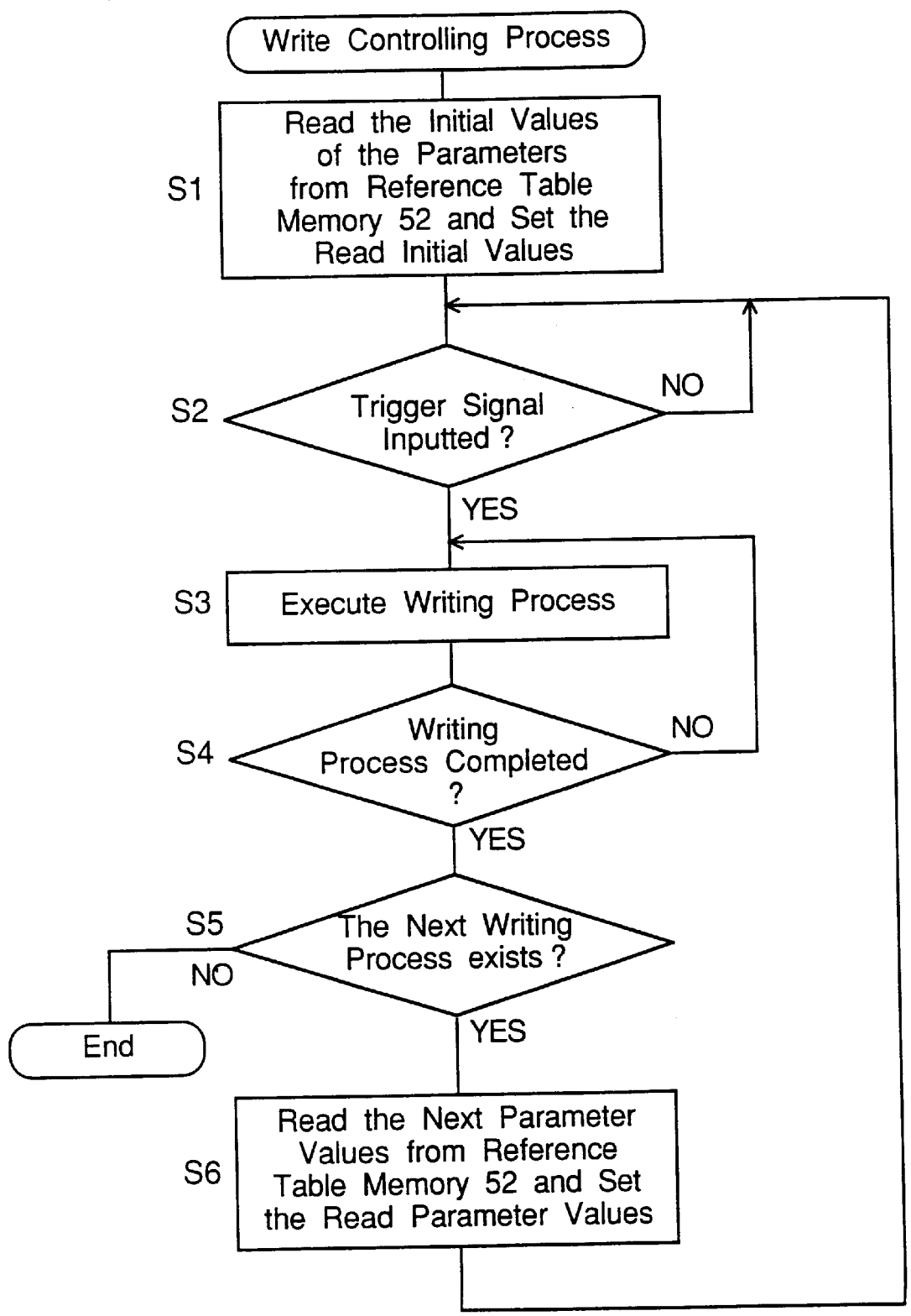
FIG. 6 is a flowchart showing a write controlling process which is executed by the write controlling module 31 of FIG. 3.
Figure 7:
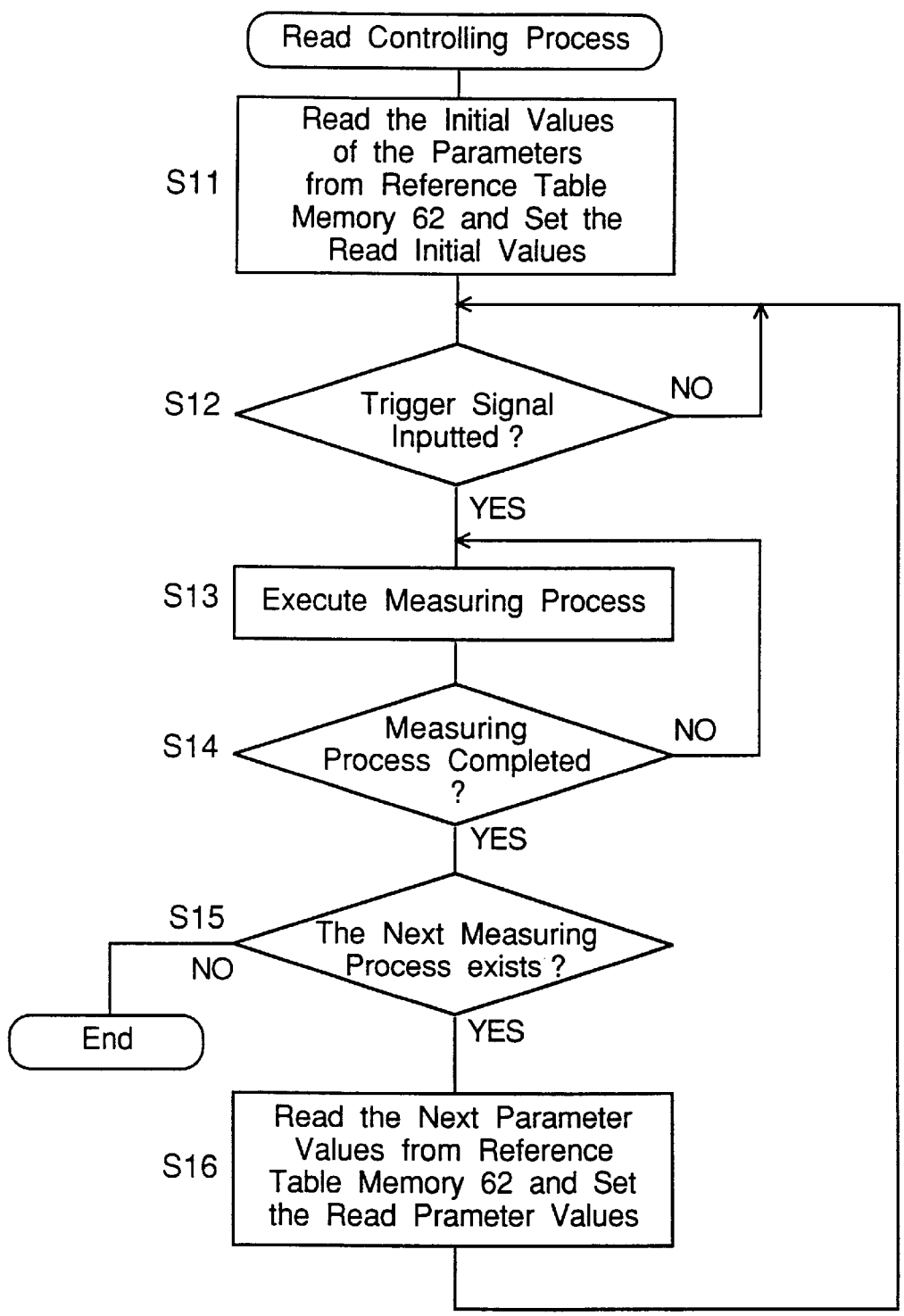
FIG. 7 is a flowchart showing a read control process which is executed by the read controlling module 32 of FIG. 4.
Figure 8:
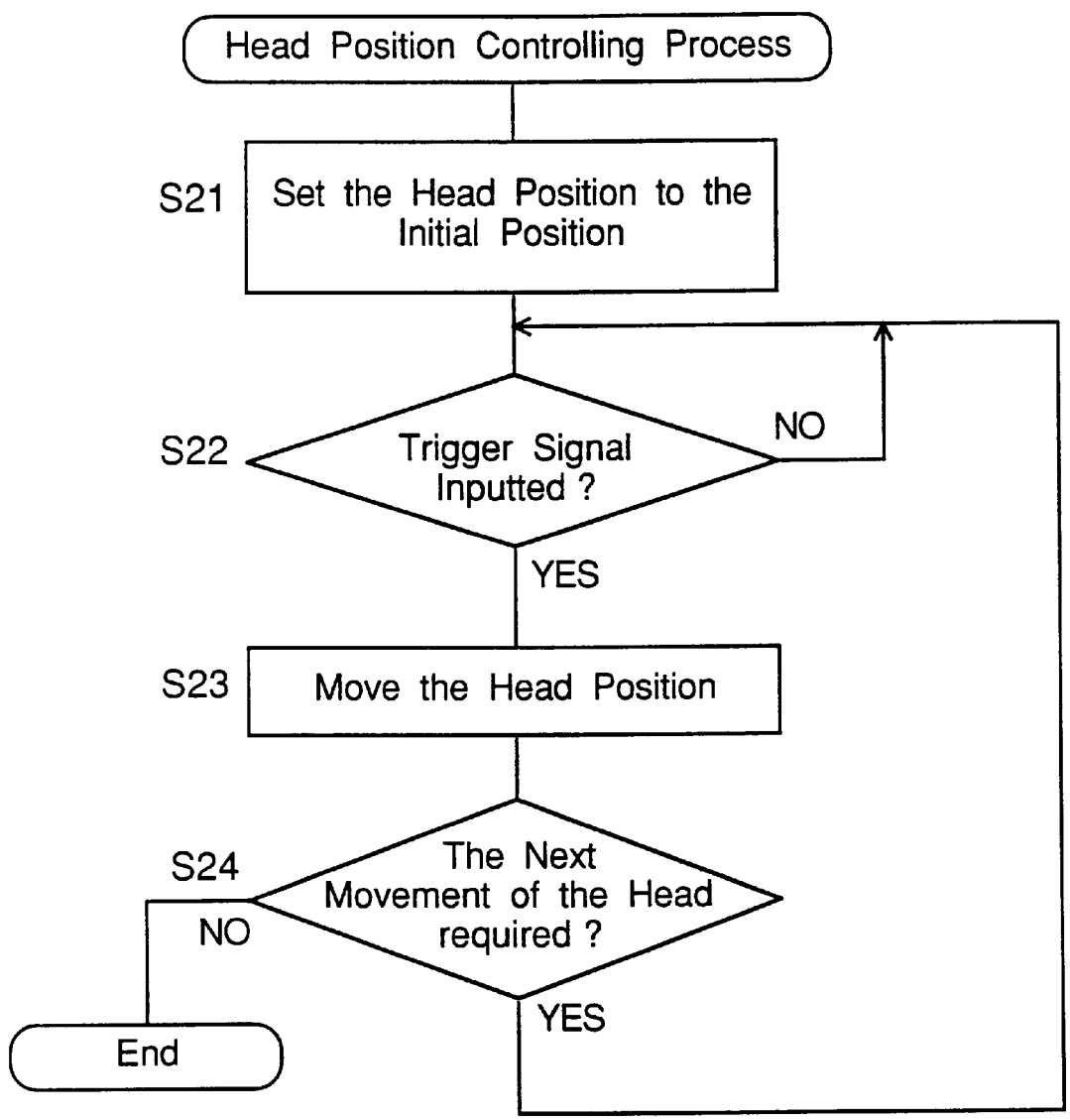
FIG. 8 is a flowchart showing a head position control process which is executed by the head position controlling module 33 of FIG. 5.

Referring to FIG. 1, one Index signal is outputted from an index sensor 5 for one revolution of a hard disk 1 when a spindle 2 is rotated by one revolution, while a trigger distribution module 30 generates one Index trigger signal (alternately referred to as an Index signal hereinafter) in response to the Index signal or a plurality of Sector trigger signals (alternately referred to as a Sector signal, and the Index trigger signal and the Sector trigger signal collectively referred to as a trigger signal, hereinafter) corresponding to the sectors of the disk 1, and then, outputs the same signals to a write controlling module 31, a read controlling module 32, and a head position controlling module 33, respectively. The write controlling module 31 executes a write controlling process as shown in FIG. 6 in response to the trigger signal, thereby executing a writing process for measurement of the hard disk 1. The read controlling module 32 executes a read control process as shown in FIG. 7 in response to the trigger signal, thereby executing a reading process for measurement of the hard disk 1. The head position controlling module 33 executes a head position control process as shown in FIG. 8 in response to the trigger signal, thereby executing a head position control process for measurement of the hard disk 1.

The spin stand 100 shown in FIG. 1 is mainly provided with the following four components:

(a) a spindle 2 for supporting the hard disk 1, a spindle motor 3 for driving the spindle to rotate the same, and a spindle motor driving circuit 11 for controlling the spindle motor 3;

(b) a head positioning control mechanism comprising a head position control mechanism 13;

(c) a write and read circuit 14; and (d) an index sensor 5.

In this case, the spindle 2 is inserted into a center hole 1h of the hard disk 1 which serves as a magnetic recording medium so as to support the hard disk 1, and then, the spindle motor 3 is connected to the spindle 2. With the rotation of the spindle motor 3, the spindle 2 is rotated to rotate the hard disk 1. In this case, when the spindle 2 is rotated to rotate the hard disk 1, one Index signal is detected and generated per rotation by the index sensor 5, and the Index signal is outputted to the trigger distribution module 30 of the measuring apparatus 200. The rotation of the spindle motor 3 is controlled by the main controller 20, and its rotation speed is normally unchanged once it is set.

The above-mentioned head positioning control mechanism is mainly divided into two sections. One is a rough positioning mechanism comprised of an X-Y stage or the like, and the other is a fine positioning mechanism comprised of a piezoelectric-stage or the like. Although the rough positioning mechanism is not shown because it has no direct relation to the present invention, the rough positioning mechanism is controlled by the main controller 20. The head position control mechanism 13 shown in FIG. 1 indicates the above-mentioned fine positioning mechanism, and it operates to finely adjust the position of a magnetic head 4 required for measurement of a track profile and so on. The operation of the head position control mechanism 13 is controlled by the head position controlling module 33. In this case, the magnetic head 4 is supported so as to move in a radial direction, in a direction perpendicular to the radial direction and approximately in a vertical direction relative to the track of the hard disk 1 so that the magnetic head 4 can be electromagnetically coupled with the surface of the hard disk 1 in a non-contact manner. The position of the magnetic head 4 is controlled by the above-mentioned head position control mechanism 13 connected to the magnetic head 4.

The write and read circuit 14 receives a write signal and a control signal from the read controlling module 32 and the write controlling module 31 of the measuring apparatus 200, and then, executes a predetermined operation as described in detail later.

The measuring apparatus 200 is roughly provided with the trigger distribution module 30, the write controlling module 31, the read controlling module 32, and the head position controlling module 33 in addition to the main controller 20 for controlling the operations of the controlling modules 30 to 33, a keyboard 21 which serves as an input means, and the CRT display 22 and the printer 23 which serve as output means. The controlling modules 30 to 33 are connected to the main controller 20 of the measuring apparatus 200 via a bus 34, and the main controller 20 starts its operation according to designation data issued by an operator from the keyboard 21 connected to the main controller 20 so as to control the controlling modules 30 to 33, execute the above-mentioned correcting or compensating process based on the data of measurement results outputted from the read controlling module 32, display the data of the measurement results and the data obtained after the correcting or compensating process on the CRT display 22, and output the data to the printer 23, thereby printing the data.

The write controlling module 31 generates not only a write signal but also a write control signal including the setting of a write current, a write timing signal and so on, and then, outputs these signals to the write and read circuit 14. The write signal is subjected to a modulation process or the like if necessary in the write and read circuit 14, and then, a processed write signal is written into the hard disk 1 via the magnetic head 4. In this stage, a predetermined write parameter value is given to the write and read circuit 14 by the inputted write control signal.

The read controlling module 32 not only receives a read signal inputted from the magnetic head 4 via the write and read circuit 14, but also generates a read control signal of MR bias current setting, read timing and so on required for reading out, and then, outputs these signals to the write and read circuit 14. In this case, the read signal from the magnetic head 4 is subjected to an amplifying process and so on if necessary in the write and read circuit 14, and then, a processed read signal is inputted to the read controlling module 32. A predetermined read parameter value is given to the write and read circuit 14 by the read control signal.

Figure 2:
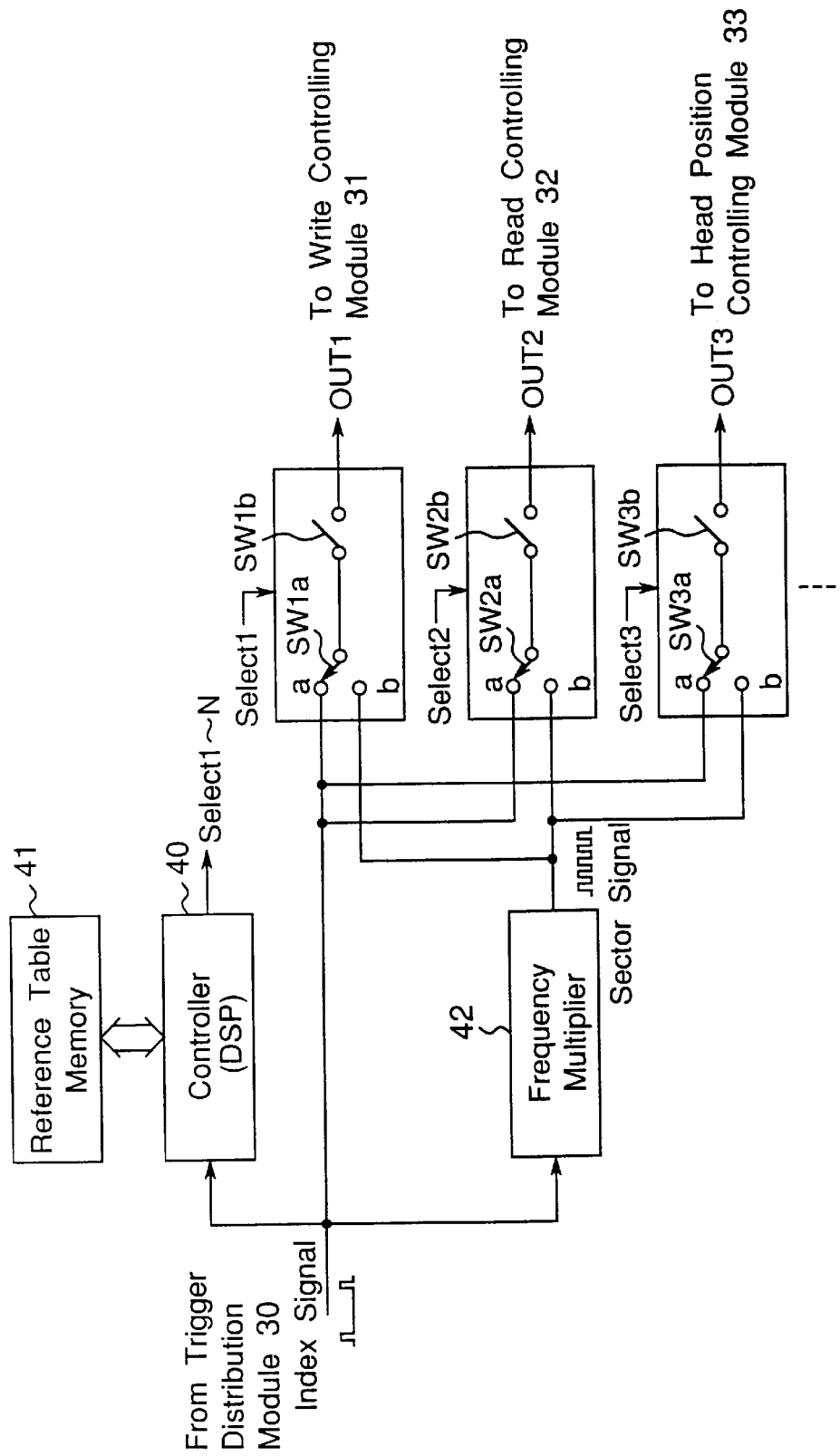
FIG. 2 is a block diagram showing a construction of a trigger distribution module 30 of FIG. 1.

FIG. 2 is a block diagram showing a construction of the trigger distribution module 30 shown in FIG. 1.

Referring to FIG. 2, the Index signal from the trigger distribution module 30 is inputted to the controller 40 and a frequency multiplier 42, and then, in response to the inputted Index signal, the controller 40 generates selecting signals Select 1, Select 2, . . . , Select N for executing switching between switches over SW1a, SW2a, SW3a, . . . and the control of turning on and off switches SW1b, SW2b, SW3b, . . . with reference to operation processing data of a reference table stored in the reference table memory 41, and then, outputs these signals to the switches SW1a, SW1b, SW2a, SW2b, SW3a, SW3b, . . . The Index signal is outputted as a trigger signal OUT1 to the write controlling module 31 via the a-contact of the switch SW1a and the switch SW1b, and further, the Index signal is outputted as a trigger signal OUT2 to the read controlling module 32 via the a-contact of the switch SW2a and the switch SW2b. Further, the Index signal is outputted as a trigger signal OUT3 to the head position controlling module 33 via the a-contact of the switch SW3a and the switch SW3b.

The frequency multiplier 42 multiplies the frequency of the inputted Index signal by, for example, ten to generate a Sector signal corresponding to each sector 1s obtained after the multiplication, and then, outputs the Sector signal as the trigger signal OUT1 to the write controlling module 31 via the b-contact of the switch SW1a and the switch SW1b.

Further, the Sector signal is outputted as the trigger signal OUT2 to the read controlling module 32 via the b-contact of the switch SW2a and the switch SW2b. Further, the Sector signal is outputted as the trigger signal OUT3 to the head position controlling module 33 via the b-contact of the switch SW3a and the switch SW3b.

Figure 3:
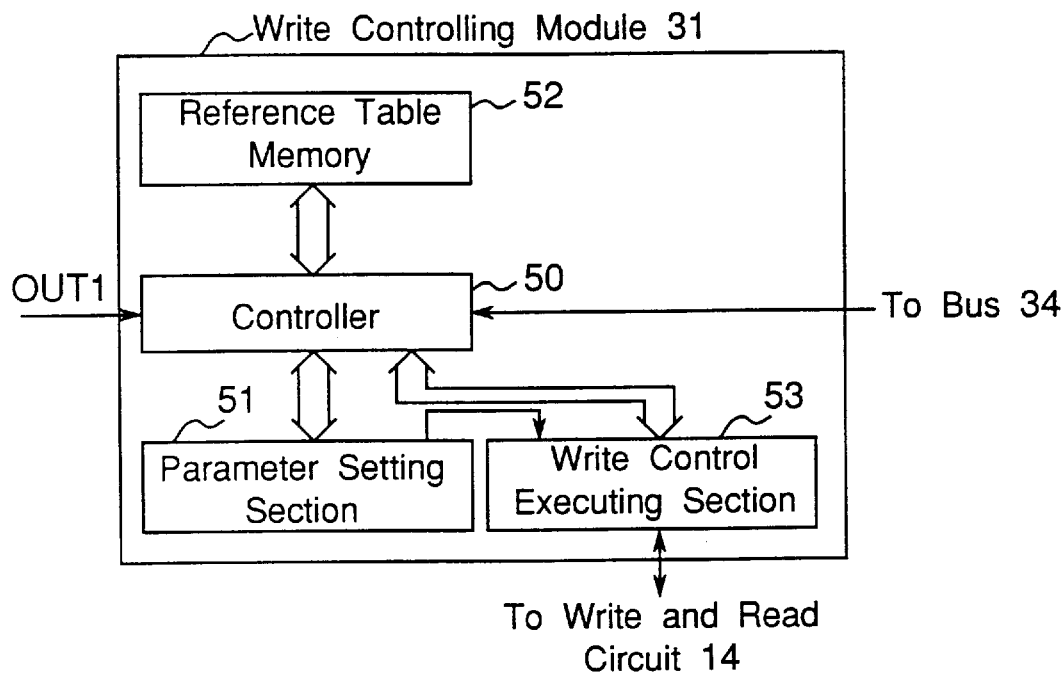
FIG. 3 is a block diagram showing a construction of a write controlling module 31 of FIG. 1.

FIG. 3 is a block diagram showing a construction of the write controlling module 31 shown in FIG. 1.

Referring to FIG. 3, a controller 50 is a control circuit which controls the operation of the write controlling module 31 and is connected to the main controller 20 via the bus 34. In response to the trigger signal OUT1, with reference to the operation processing data of the reference table stored in a reference table memory 52, the controller 50 controls the followings:

(a) a parameter setting section 51, which is provided with a D/A (digital-to-analog) converter (not shown) for setting write parameters such as a write current, and a timer (not shown) for determining the measurement time, and which controls the operation of a write control executing section 53, and (b) the write control executing section 53 which is connected to the write and read circuit 14, thereby executing a write controlling process shown in FIG. 6 and executing a writing process for the spin stand 100.

Figure 4:
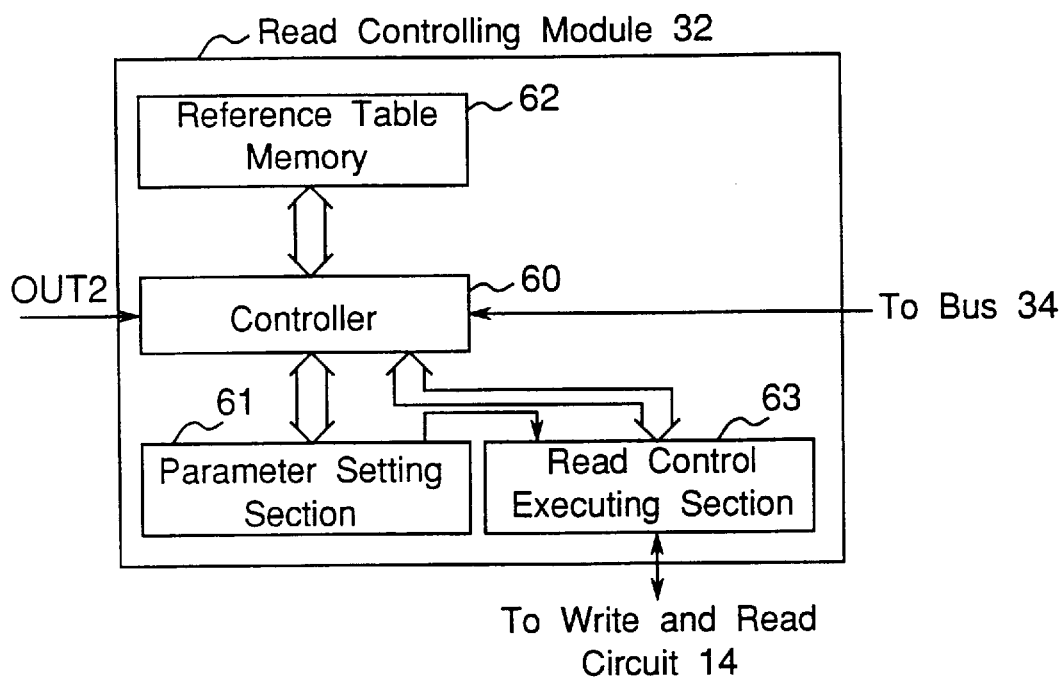
FIG. 4 is a block diagram showing a construction of a read controlling module 32 of FIG. 1.

FIG. 4 is a block diagram showing a construction of the read controlling module 32 shown in FIG. 1.

Referring to FIG. 4, a controller 60 is a control circuit which controls the operation of the read controlling module 32 and is connected to the main controller 20 via the bus 34. In response to the trigger signal OUT2, with reference to the operation processing data of the reference table stored in a reference table memory 62, the controller 60 controls the followings:

(a) a parameter control section 61, which is provided with a D/A converter (not shown) for setting the read parameter and a timer (not shown) for determining the measurement time, and which controls the operation of a read control executing section 63, and (b) the read control executing section 63 connected to the write and read circuit 14, thereby executing a read control process shown in FIG. 7 and executing a reading process for the spin stand 100.

Figure 5:
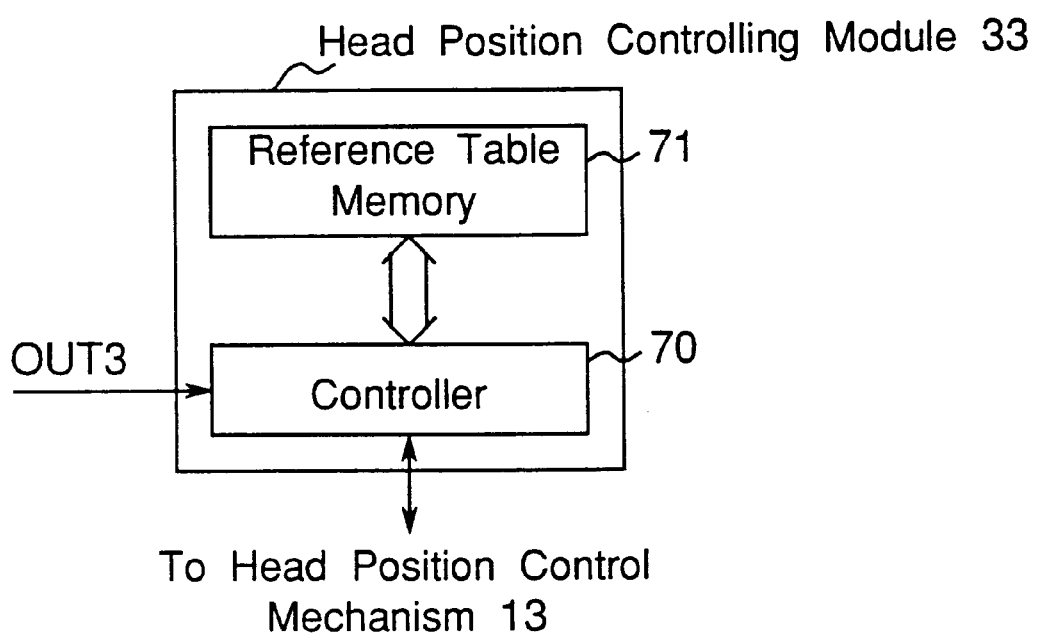
FIG. 5 is a block diagram showing a construction of a head position controlling module 33 of FIG. 1.

FIG. 5 is a block diagram showing a construction of the head position controlling module 33 shown in FIG. 1.

Referring to FIG. 5, a controller 70 is a control circuit which controls the operation of the head position controlling module 33 and is connected to the main controller 20 via the bus 34. In response to the trigger signal OUT3, with reference to the operation processing data of the reference table stored in a reference table memory 71, the controller 70 controls the head position control mechanism 13 via the bus 34, thereby executing the head position control process shown in FIG. 8 and executing the control process of the position of the magnetic head 4 for the spin stand 100.

FIG. 6 is a flowchart showing a write controlling process which is executed by the write controlling module 31 shown in FIG. 3.

Referring to FIG. 6, first of all, in step S1, the initial values of the parameters are read out from the reference table memory 52 and then are set to the parameters, and waiting is effected until a trigger signal is inputted in step S2. When the trigger signal is inputted (YES in step S2), a writing process is executed in step S3. It is decided in step S4 whether or not the writing process is completed, and the writing process of step S3 is executed until the completion of the writing process. When the writing process is completed (YES in step S4), the program flow proceeds to step S5, and then, it is decided whether or not there is the next writing process. When there is no next writing process (No in step S5), then the write controlling process is completed. When there is the next writing process (YES in step S5), the next parameter values are read out from the reference table memory 52 and then set to the parameters at step S6, and thereafter, the program flow returns to step S2 to repeat the above-mentioned processes.

FIG. 7 is a flowchart showing a read control process which is executed by the read controlling module 32 shown in FIG. 4.

Referring to FIG. 7, first of all, in step S11, the initial values of the parameter values are read out from the reference table memory 62 and then are set to the parameters, and waiting is effected until a trigger signal is inputted in step S12. When the trigger signal is inputted (YES in step S12), a measuring process for the reading is executed in step S13. It is decided in step S14 whether or not the measuring process is completed, and the measuring process of step S13 is executed until the completion of the process. When the measuring process is completed (YES in step S14), the program flow proceeds to Step S15, and then, It is decided whether or not there is the next measuring process. When there is no next measuring process (NO in step S15), the read control process is completed. When there is the next measuring process (YES in step S15), the next parameter values are read out from the reference table memory 62 and then are set to the parameters at step S16, and thereafter, the program flow returns to step S12 to repeat the above-mentioned processes.

FIG. 8 is a flowchart showing a head position control process which is executed by the head position controlling module 33 shown in FIG. 5.

Referring to FIG. 8, first of all in step S21, the position of the magnetic head 4 is controlled so that the head position is set to a predetermined initial position (a home position), and waiting is effected until a trigger signal is inputted in step S22. When the trigger signal is inputted (YES in step S22), the head position is moved by a predetermined movement distance in step S23. Then, it is decided in step S24 whether or not the next movement of the head is required. When there is required no movement of the head (NO in step S24), the head position control process is completed. When there is required another movement of the head (YES in step S24), the program flow returns to step S22 to repeat the above-mentioned processes. It is to be noted that a long time (which cannot be neglected as compared with the cycle of the Index signal) is required for the head position to reach the convergent position when the head is moved, and the head position does not normally converges within one Index signal.

In the measuring apparatus 200 shown in FIG. 1, each of the modules 30 to 33 having the various functions is programmed with one process with respect to one trigger signal, executing a series of processes without the intervention of the CPU. For example, the write controlling module 31 executes writing data on each sector while changing the write current, and thereafter, the read controlling module 32 executes the measurement of data from each sector. The write controlling module 31 is preparatorily programmed with the write current to be set in the reference table memory 52 with respect to each trigger signal, and the setting is changed for respective sectors originally by the write controlling module 31. Each of the write controlling module 31 and the read controlling module 32 is programmed with relationships (delay time and measurement time) between a received trigger signal and the time interval for which operations (writing and measurement) are to be executed and so on in the reference table memories 52 and 62 in addition to the above. By operating only for the required time (associated as a pair with the physical position of the hard disk 1), the measurement of the disk region in which the data has been written is certainly achieved.

Therefore, according to the first preferred embodiment, the measuring process can be executed at a higher speed than that of the first prior art.

In such a case where the spin stand 100 has a circuit for generating a plurality of trigger signals during one turn of the hard disk 1 and outputting the signals, the trigger signal may be used as a Sector signal without providing the frequency multiplier 42 shown in FIG. 2.

An operation example of executing the writing or measurement with one track divided into a plurality of sectors will be described next.

First Operation Exmaple

First of all, as the first operation example, an example of a MR head bias current sweep will be described. Table 2 shows a processing procedure of the first operation example.

TABLE 2

Example of Sweep of head bias current
Example of measurement with parameter values of MR head
bias current changed for respective sectors in measurement
(reading out)

Enable

| | |
|---|---|
| Index 1: | Erasing data on one track (in a special case where erasing means that the write pattern is "Erase" pattern) |
| Index 2: | Writing data on one track (for example, "HF (short-interval magnetization inverting data)" pattern) |
| Index 3: | Moving the head by the offset value |
| Index 4: | Waiting for convergence of movement of the head |
| Index 5: | Measuring the TAA with identical bias for respective sectors to measure reference values |
| Index 6: | Collecting all the TAA measurement data while changing MR head bias current for respective sectors, thereafter correcting the data, and displaying the result after correction |

As apparent from Table 2, all the operations are completed with six Index signals in the first operation example. For this execution, Table 3 shows a reference table stored in the reference table memory 41 of the trigger distribution module 30, while Table 4 shows reference tables stored in the reference table memories 52, 62 and 71 of the three controlling modules 31 to 33.

TABLE 3

Reference Table of Trigger Distribution Module 30
in Sweep Stage of MR Head Bias Current

| Index Signal | 1 | 2 | 3 | 4 | 5 | 6 |
|---|---|---|---|---|---|---|
| OUT1 (Write Control) | Index | Index | NOP | NOP | NOP | NOP |
| OUT2 (Read Control) | NOP | NOP | NOP | NOP | Sector | Sector |
| OUT3 (Head Position) | NOP | NOP | Index | NOP | NOP | NOP |

TABLE 4

Reference Tables of Controlling Modules 31, 32 and 33
in Sweep Stage of MR Head Bias Current

| Trigger Signal No. | 1 | 2 ... | 10 | 11 | 12 ... | 20 |
|---|---|---|---|---|---|---|
| Reference Table of Controlling Module 33 | | | | | | |
| Head Position (μm) | 0 | −0.1 | | | | |
| Reference Table of Controlling Module 31 | | | | | | |
| Write Current (mA) | 20 | 20 | | | | |
| Delay Time (msec) | 0.1 | 0.1 | | | | |
| Operating Time (msec) | 9.8 | 9.8 | | | | |
| Data Pattern | Erase | HF | | | | |
| Reference Table of Controlling Module 32 | | | | | | |
| Bias Current (mA) | 20 | 20 ... | 20 | 10 | 12 ... | 0.1 |
| Delay Time (msec) | 0.1 | 0.1 ... | 0.1 | 0.1 | 0.1 ... | 0.1 |
| Operating Time (msec) | 0.8 | 0.8 ... | 0.8 | 0.8 | 0.8 ... | 0.8 |
| Measurement item | TAA | TAA ... | TAA | TAA | TAA ... | TAA |

As is apparent from Table 3, the trigger signals OUT1, OUT2 and OUT3 to be outputted from the trigger distribution module 30 are listed with respect to the Index signal inputted to the trigger distribution module 30. Referring to Table 3, the Index signal is outputted directly as an Index trigger signal for the trigger signal OUT1 in response to an Index 1 signal which serves as a first Index, the Index signal is outputted directly as an Index trigger signal for the trigger signal OUT1 in response to an Index 2 signal which serves as a second Index, and no signal is outputted subsequently. In this case, "NOP" means that no process is executed, i.e., no signal is outputted. In regard to the trigger signal OUT2, no signal is outputted until an Index 4 signal which serves as a fourth Index signal, and then, in response to an Index 5 which serves as a fifth Index signal, ten Sector signals outputted as the trigger signal OUT2 from the frequency multiplier 42 are continuously and sequentially outputted. Then, in response to an Index 6 which serves as a sixth Index signal, ten Sector signals outputted as the trigger signal OUT3 from the frequency multiplier 42 are continuously and sequentially outputted, and thereafter, the operation is completed. Further, in regard to the trigger signal OUT3, no signal is outputted until the Index 2 signal which serves as the second Index signal, and then, in response to an Index 3 which serves as a third Index signal, the Index signal is outputted directly as the trigger signal OUT3, and no signal is outputted subsequently.

Table 4 shows a list of the processing parameters which is executed in response to each trigger signal inputted to the controlling modules 31 to 33. In the present preferred embodiment, a plurality of tracks 1t are formed in a concentric circular form arevolution the center O of the hard disk 1. As shown in FIG. 17, one revolution of the track of the hard disk 1 (corresponding to the interval for the occurrence of the Index signal generated from the index sensor 5) is set to 10 milliseconds, and one track 1t is divided into ten sectors 1s (1 millisecond per sector). In the present first operation example, as is apparent from Table 2, after the writing process started by the Index 1 signal and the Index 2 signal of the trigger signal OUT1, the head position is moved by the Index 3 signal of the trigger signal OUT3, and thereafter, the reading process is executed. In this case, it is assumed that a time interval corresponding to two Index signals is required for the movement of the head position. That is, the trigger signal OUT2 is outputted after a lapse of a time interval corresponding to two Index signals subsequently to the Index 3 signal which serves as the trigger signal OUT3 for moving the head.

Only the head position, the data pattern, the write current or the bias current in the reading stage, delay time (meaning the time of delay from the trigger signal) and the operating time (meaning an operation continuing time from the start of the operation) are described as the parameters to be set for simplicity of explanation according to the description of the operation example. However, in practical, there exist the other variable parameters such as the write compensation amount, and therefore, the present invention is not limited to the above description.

The present preferred embodiment adopts a system in which the controlling modules 31 to 33 do not discriminate whether the inputted trigger signal is the Index trigger signal or the Sector trigger signal except for the arrangement that the operating time is set relatively short in the operation based on the Sector trigger signal and the operating time is set relatively long in the operation based on the Index trigger signal. The present invention may be constructed so that all of the controlling modules 31 to 33 receive the Index trigger signal and divide the Index trigger signal into the Sector signals within the controlling modules 31–33.

Further, the first operation example will be described in detail below.

(a) Initial setting: The initial value (left-hand end; trigger signal No. 1) of the reference table of Table 4 is set, and after the setting, it is set to an "Enable" state. The term "Enable" means an operation to enable the Index from the spindle to be received.

(b) Index 1: According to the reference table of Table 3, the Index trigger signal is outputted as the trigger signal OUT1. In response to this, the write controlling module 31 writes an erase pattern for 9.8 milliseconds after a delay of 0.1 millisecond from the Index trigger signal according to the reference table (trigger signal No. 1) of Table 4, and then, erases the data.

(c) Index 2: According to the reference table of Table 3, the Index trigger signal is outputted as the trigger signal OUT1. In response to this, the write controlling module 31 writes an HF pattern for 9.8 milliseconds after a delay of 0.1 millisecond according to the reference table (trigger signal No. 2) of Table 4. After completing the writing process, the write controlling module 31 enters an end state.

(d) Index 3: According to the reference table of Table 3, the Index trigger signal is outputted as the trigger signal OUT3. In response to this, the head position controlling module 33 sets the head position in a position shifted by −0.1 .m from the predetermined home position according to the reference table (trigger signal No. 2) of Table 4.

(e) Index 4: According to the reference table of Table 3, the trigger signal is outputted to no output port of the trigger distribution module 30. None of the controlling modules 31 to 33 operates. The reason why such a time is provided is that a considerable time is required for the convergence of the head position and therefore the next readable state cannot be achieved only with one Index signal.

(f) Index 5: According to the reference table of Table 3, the Sector trigger signal is outputted as the trigger signal OUT2. In regard to this Sector trigger signal, ten trigger signals are outputted from the trigger distribution module 30 for one Index signal. The operation of the read controlling module 32 for respective sectors trigger signal will be described below.

(f1) Sector 1: In response to the Sector trigger signal which serves as the trigger signal OUT2, the read controlling module 32 measures the TAA for 0.8 millisecond after a delay of 0.1 millisecond according to the reference table of Table 4.

(f2) Sector 2: In response to the Sector trigger signal which serves as the next trigger signal OUT2, the read controlling module 32 measures the TAA for 0.8 millisecond after a delay of 0.1 millisecond according to the reference table (trigger signal No. 11) of Table 4.

(f3) Sector 3, 4, . . . , 9: The read controlling module 32 operates in a manner similar to that of the above (f1) and (f2).

(f4) Sector 10: In response to the Sector trigger signal which serves as the last trigger signal OUT2, the read controlling module 32 measures the TAA for 0.8 millisecond after a delay of 0.1 millisecond according to the reference table (trigger signal No. 20) of Table 4.

(g) Index 6: According to the reference table of Table 3, the Sector trigger signal which serves as the trigger signal OUT2 is outputted. In regard to this Sector trigger signal, ten Sector trigger signals are outputted from the trigger distribution module 30 for one Index signal. The operation of the read controlling module 32 for respective sectors trigger signal will be described below.

(g1) Sector 1: In response to the Sector trigger signal which serves as the first trigger signal OUT2, the read controlling module 32 measures the TAA for 0.8 millisecond after a delay of 0.1 millisecond with an MR head bias current of 10 mA according to the reference table of Table 4.

(g2) Sector 2: In response to the Sector trigger signal which serves as the second trigger signal OUT2, the read controlling module 32 measures the TAA for 0.8 millisecond after a delay of 0.1 millisecond with an MR head bias current of 12 mA according to the reference table of Table 4.

(g3) Sector 3, 4, . . . , 9: Operations similar to those of the above (g1) and (g2) are executed except for the operation of changing (increasing) only the MR head bias current in a step of 2 mA.

(g4) Sector 10: In response to the Sector signal which serves as the last trigger signal OUT2, the read controlling module 32 measures the TAA for 0.8 millisecond after a delay of 0.1 millisecond with an MR head bias current of 28 mA according to the reference table of Table 4. After completing the measurement, the controller 60 of the read controlling module 32 completes its operation.

Figure 16:
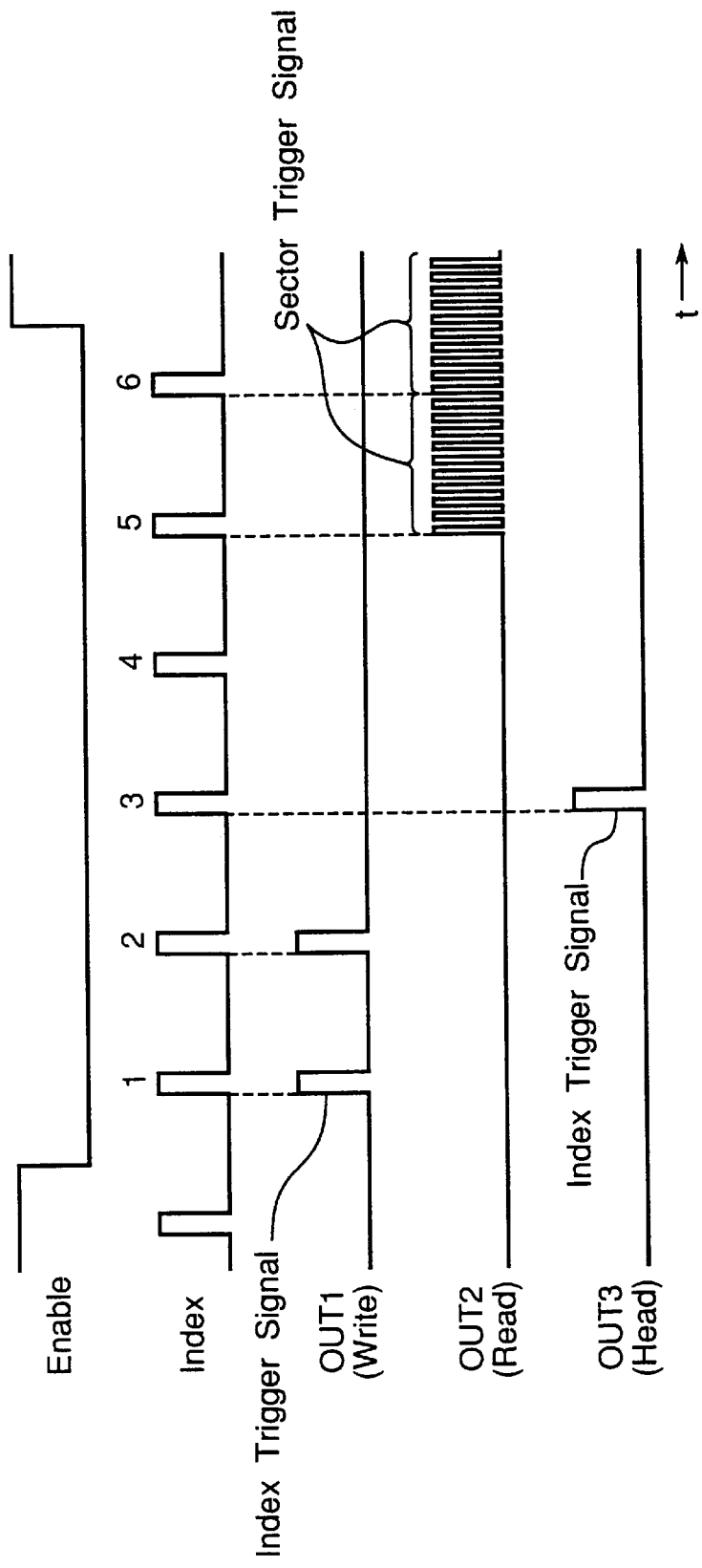
FIG. 16 is a timing chart showing an operation example of the trigger distribution module 30 in a sweep stage of an MR head bias current of the first preferred embodiment.

FIG. 16 shows a timing chart in which the above-mentioned operations are arranged on the time axis, while Table 5 shows a timing chart of the operation for each Index signal. In contrast to the reference table of Table 4 which shows not the actual timing but the processing operation of the controlling module in response to the trigger signal, Table 5 shows the operation on the time axis for each Index signal.

TABLE 5

Operation Example of Each Control for Each Index Signal in Sweep Stage of MR Head Bias Current

| Index Signal | 1 | 2 | 3 | 4 | 5 | 6 |
|---|---|---|---|---|---|---|
| Head Position Control | | | | | | |
| Head Position (μm) | 0 | −0.1 | | | | |
| Write Control | | | | | | |
| Trigger Signal | Index | Index | | | | |
| Write Current (mA) | 20 | 20 | | | | |
| Delay Time (msec) | 0.1 | 0.1 | | | | |
| Operating Time (msec) | 9.8 | 9.8 | | | | |
| Data Pattern | Erase | HF | | | | |
| Read Control | | | | | | |
| Trigger Signal | | | Sector | Sector ... | Sector | Sector |
| Bias Current (mA) | | | 20 | 20 ... | 20 | 10 |
| Delay Time (msec) | | | 0.1 | 0.1 ... | 0.1 | 0.1 |
| Operating Time (msec) | | | 0.8 | 0.8 ... | 0.8 | 0.8 |
| Measurement Item | | | TAA | TAA ... | TAA | TM |

*Note: Columns 5 continues with Sector 12 ... 0.1 ... 0.1 ... 0.8 ... TAA, and column 6 with Sector, 0.1, 0.1, 0.8, TAA.*

In the first operation example, as shown in FIG. 17, a margin interval of 0.1 millisecond is formed at the beginning and at the end of one sector 1s. This margin interval is a time interval required for the setting and convergence of the set parameter value and also required as a margin for the variation in rotation of the spindle 2 and for the jitter of the Index signal.

Second Operation Example

Figure 18:
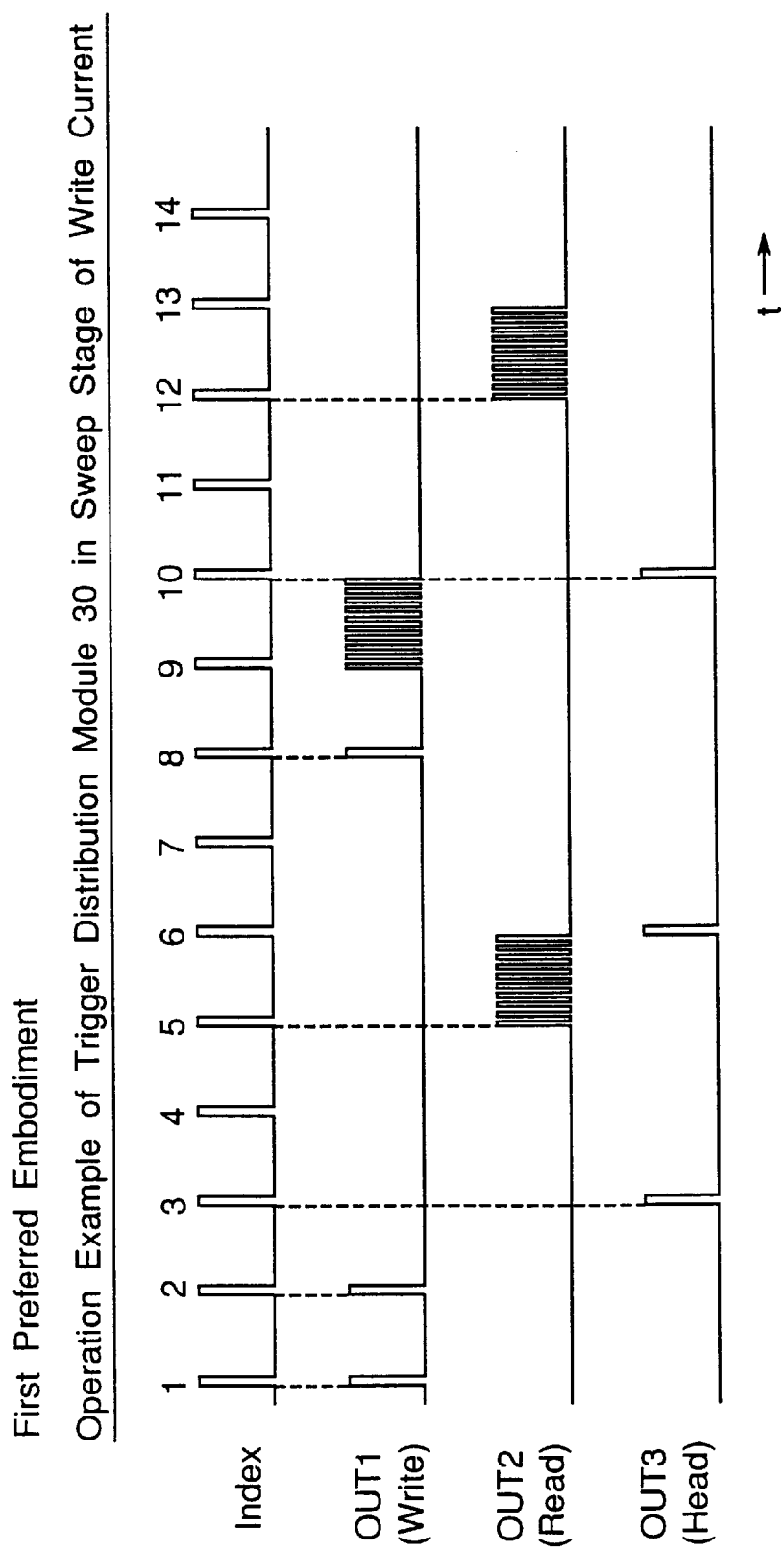
FIG. 18 is a timing chart showing an operation example of the trigger distribution module 30 in a sweep stage of a write current of the first preferred embodiment.

As a further complicated example of a series of operations, an example in which a write operation is executed with the write current changed for respective sectors and the TAA is measured. Table 6 is a description of the operation. Table 7 shows a reference table of the trigger distribution module 30 for implementing the operation, while Table 8 shows a reference table of three controlling modules 31 to 33 for implementing the operation. Further, FIG. 18 is a timing chart showing an operation corresponding to the operation of the first operation example shown in FIG. 16, while Table 9 and Table 10 correspond to Table 5 of the first operation example and show the operation on the time axis for each Index signal. The manner of describing FIG. 18 and Tables of the second operation example is similar to those of the first operation example, and therefore, no description is provided for them.

TABLE 6

Example of Sweep of write current
Example of measurement with the parameter value of write current changed for respective sectors in writing and with fixed parameter value in reading (measuring)

| Enable | |
|---|---|
| Index 1: | Erasing one track |
| Index 2: | Writing data only on one track (For example, "HF (short-interval magnetization inverting data)" pattern) |
| Index 3: | Moving head by offset |
| Index 4: | Waiting for convergence of the movement of the head |
| Index 5: | Measuring the TAA for respective sectors for taking reference value |
| Index 6: | Setting back head offset |
| Index 7: | Waiting for movement convergence |
| Index 8: | Erasing preceding track |
| Index 9: | Writing data on one track while changing write current for respective sectors (write pattern is, for example, "HF (short-interval magnetization inverting data)" pattern) |
| Index 10: | Moving by head offset |
| Index 11: | Waiting for convergence of the movement of the head |
| Index 12: | Collecting all the TAA measurement data for respective sectors, thereafter correcting the data and displaying the result after correction |

TABLE 7

Reference Table of Trigger Distribution Module 30 in Sweep Stage of Write Current

| Index Signal | 1 | 2 | 3 | 4 | 5 | 6 | 7 | 8 | 9 | 10 | 11 | 12 |
|---|---|---|---|---|---|---|---|---|---|---|---|---|
| OUT1 (Write Control) | Index | Index | NOP | NOP | NOP | NOP | NOP | Index | Sector | NOP | NOP | NOP |
| OUT2 (Read Control) | NOP | NOP | NOP | NOP | Sector | NOP | NOP | NOP | NOP | NOP | NOP | Sector |
| OUT3 (Head Position) | NOP | NOP | Index | NOP | NOP | Index | NOP | NOP | NOP | Index | NOP | NOP |

TABLE 8

Reference Table of Controlling Modules 31, 32 and 33 in Sweep Stage of Write Current

| Trigger Signal No. | 1 | 2 | 3 | 4 | 5 ... | 13 | 14 | ... | 20 |
|---|---|---|---|---|---|---|---|---|---|
| Reference Table of Controlling Module 33 | | | | | | | | | |
| Head Position (μm) | 0 | −0.1 | 0 | −0.1 | | | | | |
| Reference Table of Controlling Module 31 | | | | | | | | | |
| Write Current (mA) | 20 | 20 | 20 | 10 | 12 ... | 28 | | | |
| Delay Time (msec) | 0.1 | 0.1 | 0.1 | 0.1 | 0.1 ... | 0.1 | | | |
| Operating Time (msec) | 9.8 | 9.8 | 9.8 | 0.8 | 0.8 ... | 0.8 | | | |
| Data Pattern | Erase | HF | Erase | HF | HF ... | HF | | | |
| Reference Table of Controlling Module 32 | | | | | | | | | |
| Bias Current (mA) | 20 | 20 | 20 | 20 | 20 ... | 20 | 20 | ... | 20 |
| Delay Time (msec) | 0.1 | 0.1 | 0.1 | 0.1 | 0.1 ... | 0.1 | 0.1 | ... | 0.1 |
| Operating Time (msec) | 0.8 | 0.8 | 0.8 | 0.8 | 0.8 ... | 0.8 | 0.8 | ... | 0.8 |
| Measurement Item | TAA | TAA | TAA | TAA | TAA ... | TAA | TAA | ... | TAA |

TABLE 9

Operation Example (Part 1) of Each Control for Each Index Signal in Sweep Stage of Write Current

| Index Signal | 1 | 2 | 3 | 4 | 5 | 6 | 7 |
|---|---|---|---|---|---|---|---|
| Head Position Control | | | | | | | |
| Head Position (μm) | 0 | | −0.1 | | | 0 | |
| Write Control | | | | | | | |
| Trigger Signal | Index | Index | | | | | |
| Write Current (mA) | 20 | 20 | | | | | |
| Delay Time (msec) | 0.1 | 0.1 | | | | | |
| Operating Time (msec) | 9.8 | 9.8 | | | | | |
| Data Pattern | Erase | HF | | | | | |
| Read Control | | | | | | | |
| Trigger Signal | | | | | Sector | Sector ... | Sector |
| Bias current (mA) | | | | | 20 | 20 ... | 20 |
| Delay Time (msec) | | | | | 0.1 | 0.1 — | 0.1 |
| Operating Time (msec) | | | | | 0.8 | 0.8 ... | 0.8 |
| Measurement Item | | | | | TAA | TAA ... | TAA |

TABLE 10

Operation Example (Part 2) of Each Control for Each Index Signal in Sweep Stage of Write Current

| Index Signal | 8 | 9 | 10 | 11 | 12 |
|---|---|---|---|---|---|
| Head Position Control | | | | | |
| Head Position ($\mu$m) | −0.1 | | | | |
| Write Control | | | | | |
| Trigger Signal | Index | Sector | Sector ... | | Sector |
| Write Current (mA) | 20 | 10 | 12 ... | | 28 |
| Delay Time (msec) | 0.1 | 0.1 | 0.1 ... | | 0.1 |
| Operating Time (msec) | 9.8 | 9.8 | 0.8 ... | | 0.8 |
| Data Pattern | Erase | HF | HF ... | | HF |
| Read Control | | | | | |
| Trigger Signal | | | Sector | Sector ... | Sector |
| Bias Current (mA) | | | 20 | 20 ... | 20 |
| Delay Time (msec) | | | 0.1 | 0.1 ... | 0.1 |
| Operating Time (msec) | | | 0.8 | 0.8 ... | 0.8 |
| Measurement Item | | | TAA | TAA ... | TAA |

As a reference table describing method, a description on the time axis for each Index signal as shown in Table 5 is acceptable. In other words, it is acceptable in the present invention to write such instructions that the controlling module executes nothing ("NOP") in response to a certain trigger signal into the reference table of the controlling module and make the trigger distribution module 30 continue to transmit a trigger signal.

In the construction of the above first preferred embodiment, the trigger distribution module 30, the write controlling module 31, the read controlling module 32 and head position controlling module 33 are separated by their functions and each of them is provided by one printed circuit board like in the form of a module. However, the present invention is not limited to this, and it is acceptable to constitute them one by one module or constitute the modules 30 to 33 by separate units.

A modified preferred embodiment of the first preferred embodiment will be further described. The present modified preferred embodiment is constructed so that the controlling modules 31 to 33 have an ability of internally generating a Sector trigger signal or is constructed so that a Sector trigger signal and an Index trigger signal are consistently and externally inputted and they are switched over by a switch provided in the controlling module. With this arrangement, the construction of the trigger distribution module 30 can be simplified or eliminated.

Figure 9:
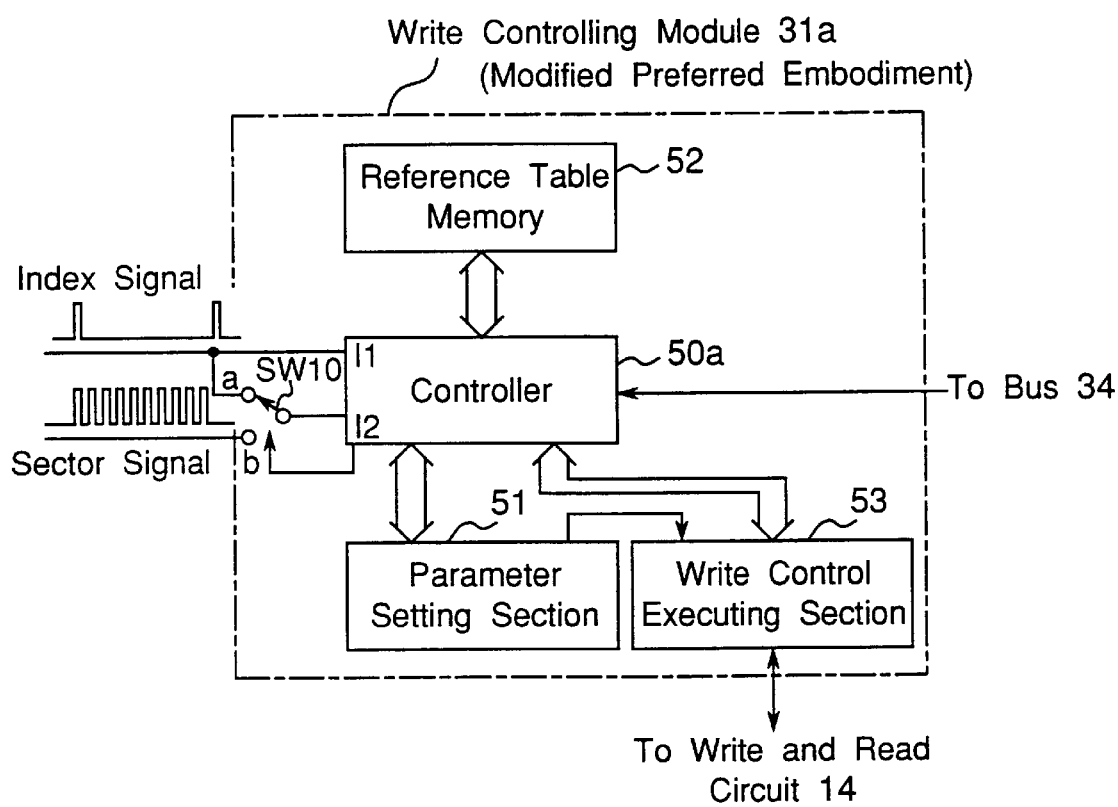
FIG. 9 is a block diagram showing a construction of a write controlling module 31a of a modified preferred embodiment.
Figure 10:
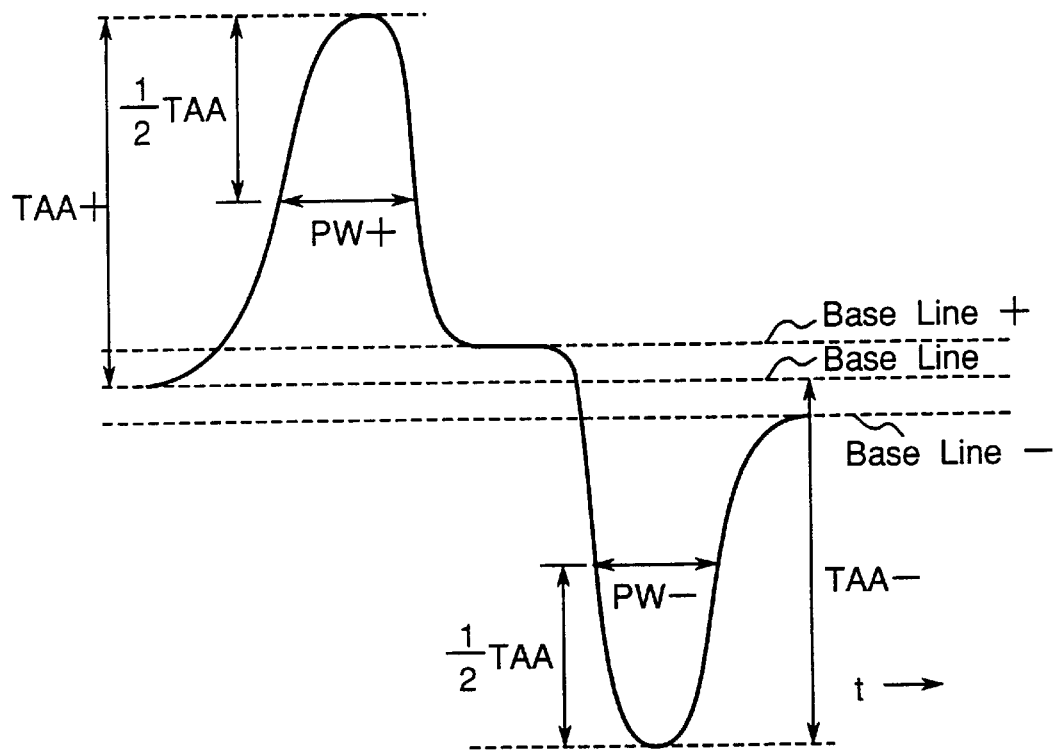
FIG. 10 is a waveform chart showing a signal waveform of a track averaged amplitude (TAA) of a prior art.
Figure 11:
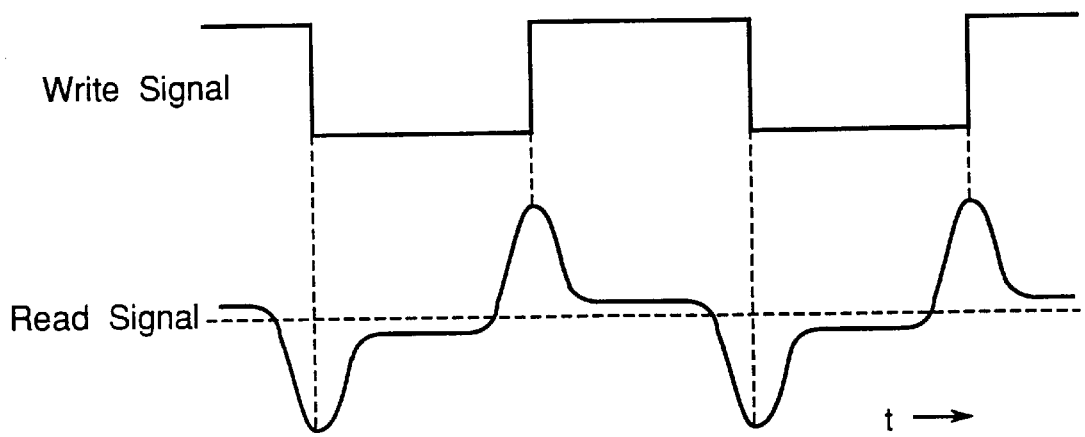
FIG. 11 is a waveform chart showing signal waveforms of a write signal and a read signal in a prior art hard disk unit.
Figure 12:
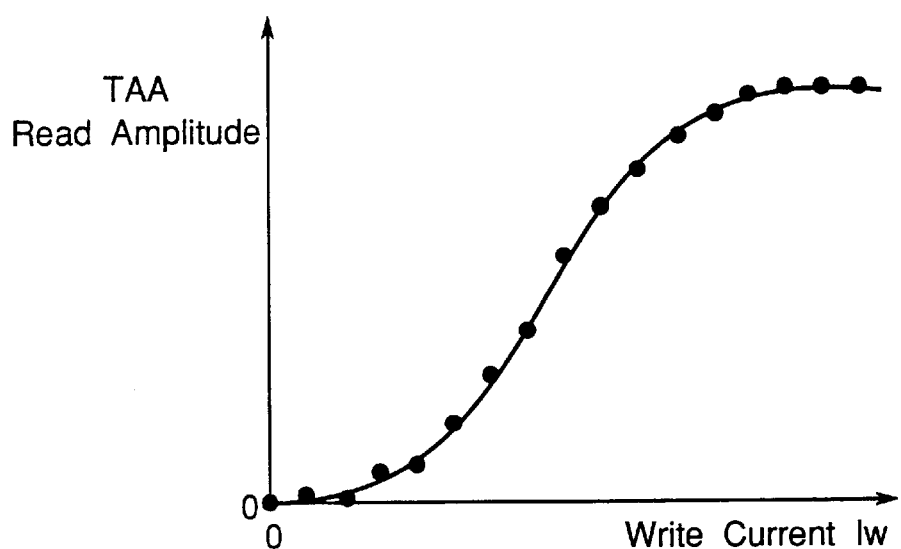
FIG. 12 is a graph showing a relationship of a TAA read amplitude to a write current Iw on a hard disk.

FIG. 9 is a block diagram showing a construction of the write controlling module 31a of the modified preferred embodiment in the latter case.

Referring to FIG. 9, an Index signal is inputted to an input port I1 of a controller 50a and is inputted to an input port I2 of the controller 50a via the a-contact of a switch SW10. A Sector signal is inputted to the input port I2 of the controller 50a via the b-contact of the switch SW10. Tables 11 to 13 show reference tables A and B in the sweep stage of the MR head bias current of the modified preferred embodiment.

TABLE 11

Reference Table A of Head Position Controlling module (Modified preferred embodiment) in Sweep Stage of MR Head Bias Current

| Index Signal No. | 1 | 2 | 3 |
|---|---|---|---|
| Trigger Signal | Index Reference Table B | NOP | Index |
| Head Position (. m) | 0 | | −0.1 |

TABLE 12

Reference Table A of Write Controlling module 31a (Modified preferred embodiment) in Sweep Stage of MR Head Bias Current

| Index Signal No. | 1 | 2 |
|---|---|---|
| Trigger Signal | Index Reference Table B | Index |
| Write Current (mA) | 20 | 20 |
| Delay Time (msec) | 0.1 | 0.1 |
| Operating Time (msec) | 9.8 | 9.8 |
| Data Pattern | Erase | HF |

TABLE 13

Reference Table A of Read Controlling module (Modified preferred embodiment) in Sweep Stage of MR Head Bias Current

| Index Signal No | 1 | 2 | 3 | 4 | 5 | 6 | | | | |
|---|---|---|---|---|---|---|---|---|---|---|
| Trigger Signal | NOP | NOP | NOP | NOP | Sector | Sector | | | | |
| Reference Table B (Part 1) | | | | | | | | | | |
| Write Current (mA) | 20 | 20 | 20 | 20 | 20 | 20 | 20 | 20 | 20 | 20 |
| Delay Time (msec) | 0.1 | 0.1 | 0.1 | 0.1 | 0.1 | 0.1 | 0.1 | 0.1 | 0.1 | 0.1 |
| Operating Time (msec) | 0.8 | 0.8 | 0.8 | 0.8 | 0.8 | 0.8 | 0.8 | 0.8 | 0.8 | 0.8 |
| Measurement Item | TAA | TAA | TAA | TAA | TAA | TAA | TAA | TAA | TAA | TAA |
| Reference Table B (Part 2) | | | | | | | | | | |
| Write Current (mA) | 10 | 12 | 14 | 16 | 18 | 20 | 22 | 24 | 26 | 28 |
| Delay Time (msec) | 0.1 | 0.1 | 0.1 | 0.1 | 0.1 | 0.1 | 0.1 | 0.1 | 0.1 | 0.1 |
| Operating Time (msec) | 0.8 | 0.8 | 0.8 | 0.8 | 0.8 | 0.8 | 0.8 | 0.8 | 0.8 | 0.8 |
| Measurement Item | TAA | TAA | TAA | TAA | TAA | TAA | TAA | TAA | TAA | TAA |

In this case, the reference table A is a table which is referred in response to each Index signal inputted to the input port I1, and which shows a process executed in response to each Index signal. In this case, the switch SW10 is switched over to the a-contact when the trigger signal is "Index", and the switch SW10 is switched over to the b-contact when the trigger signal is "Sector". The reference table B shows operation parameter values to be set in response to the Index trigger signal or the Sector trigger signal inputted to the input port I2. This modified preferred embodiment has a unique effect that it is not required to be provided with the trigger distribution module 30.

Further, another reference table describing method is shown in Table 14.

TABLE 14

Reference Table of Each Control (Modified preferred embodiment) in Sweep Stage of MR Head Bias Current (Mother Example)

| Trigger Signal No. | 1 | 2 | 3 | 4 | 5 |
|---|---|---|---|---|---|
| Head Position Control | | | | | |
| Head Position (μm) | 0 | NOP | −0.1 | NOP | NOP |
| Write Control | | | | | |
| Write Current (mA) | 20 | 20 | NOP | NOP | NOP |
| Delay Time (msec) | 0.1 | 0.1 | NOP | NOP | NOP |
| Operating Time (msec) | 9.8 | 9.8 | NOP | NOP | NOP |
| Data Pattern | Erase | HF | NOP | NOP | NOP |
| Read control | | | | | |
| Bias Current (mA) | NOP | NOP | NOP | NOP | 20 |
| Delay Time (msec) | NOP | NOP | NOP | NOP | 0.1 |
| Operating Time (msec) | NOP | NOP | NOP | NOP | 0.8 |
| Measurement Item | NOP | NOP | NOP | NOP | TAA |

According to the other describing method, the processes which is executed every inputted Index signal by the controlling modules 31 to 33 on the time axis are described in a reference table. The example of Table 14 is an example in which the read controlling module 32 executes the TAA measurement one time, and this example cannot execute the write and reading processes for respective sectors.

Second Preferred Embodiment

Figure 13:
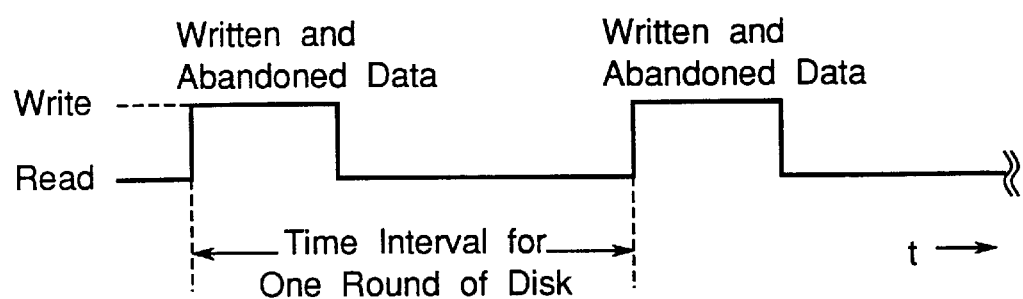
FIG. 13 is a timing chart showing write and read according to a prior art hard disk unit measuring method.
Figure 19:
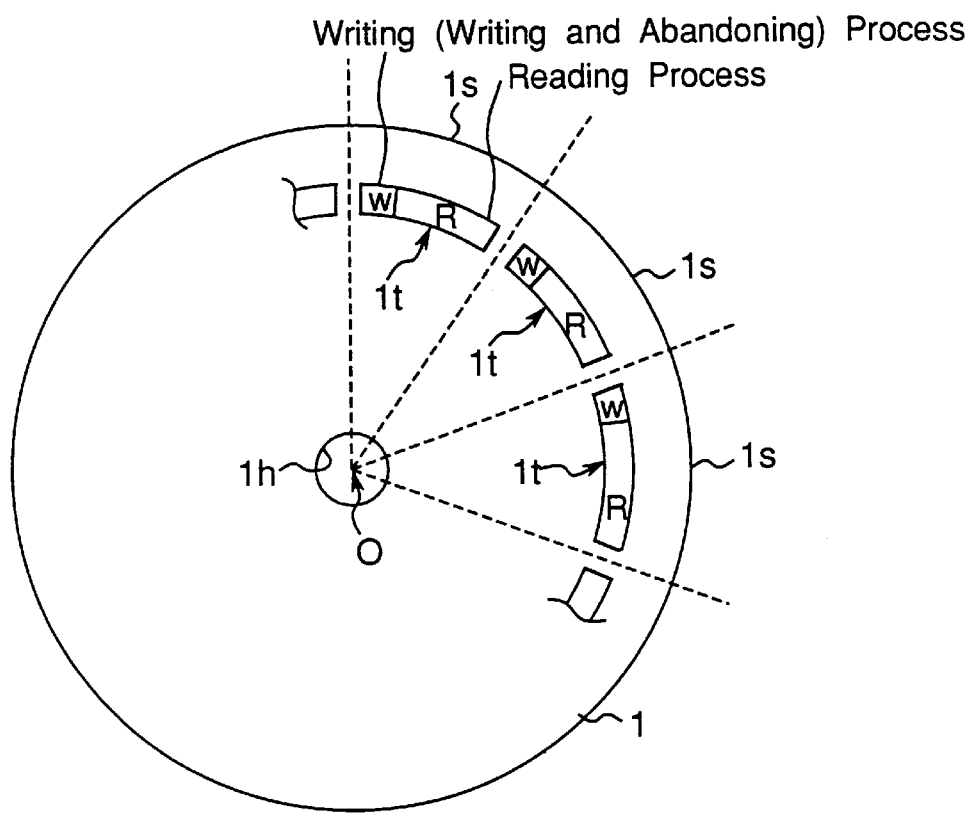
FIG. 19 is a plan view showing a process on a track of a hard disk according to a second preferred embodiment.

The second preferred embodiment is provided for solving the problems of the second prior art and is able to execute at a high speed a measurement requiring statistical processing of a number of measurement data such as the evaluation of an instability by measuring a plurality of times an identical measurement while the hard disk 1 makes one turn. That is, a series of works of writing (writing and abandoning) and reading is executed while the hard disk 1 is rotated by one turn as shown in FIG. 13 in the second prior art, whereas a series of works of writing (writing and abandoning) and reading is completed within one sector 1s as shown in FIG. 19 in the second preferred embodiment. With this arrangement, a plurality of times of measurements can be achieved in the time interval for which the hard disk 1 is rotated by one turn, thereby allowing a high-speed measurement to be achieved. In this case, the data to be read out has been preparatorily written on the track 1t of the hard disk 1. The data written in the writing (writing and abandoning) operation is not provided for the purpose of reading out but for the purpose of promoting the change in characteristics of the read element of the magnetic head 4 due to the write operation. The second preferred embodiment can be implemented by merely rewriting the reference table by means of the instrument construction of the first preferred embodiment or its modified preferred embodiment.

Figure 20:
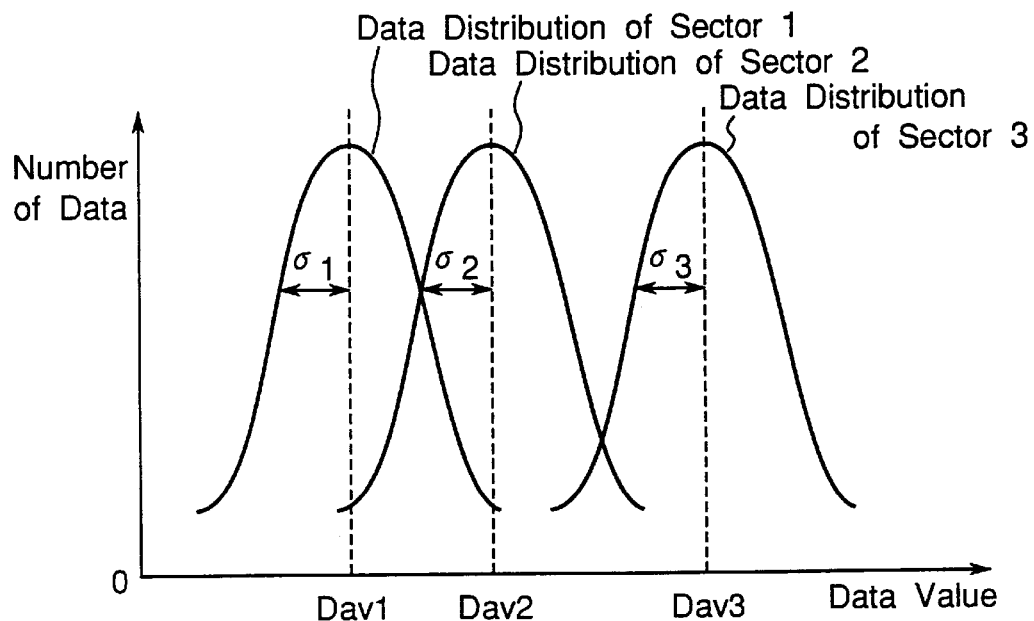
FIG. 20 is a graph showing a data distribution of sectors of the second preferred embodiment.

Also in this measurement, in an attempt at compensating for the non-uniformity in the disk characteristics of sectors in calculating the variation through the statistical processing, by previously and individually calculating the statistic value of each sector and handling only the variation between the sectors, it is allowed to compensate for the non-uniformity. In such a case where the average values of the sectors themselves are changed as shown in FIG. 20, when viewing the variation by mixing the data of all the sectors, even the non-uniformity of the disk is calculated as a variation. If they are processed individually for respective sectors, a variance $\sigma$ for one revolution can be calculated by the following equation:

$$\sigma^2 = \sigma_1^2 + \sigma_2^2 + \sigma_3^2 + \ldots + \sigma_N^2 \quad (1)$$

where $\sigma_n$ is the variance of the data distribution of the sector n (n=1, 2, . . . , N, and N is the number of sectors on one revolution of the track). By calculating the variance $\sigma$ for one revolution by means of the above equation (1), the stability and the variation of the read signal through the writing process can be measured, and there is such a unique advantageous effect that the evaluation of the variation of the data is not influenced by the average value of respective sectors.

Therefore, according to the measuring apparatus of the second preferred embodiment, the measurement can be executed at a higher speed and more correctly than that of the prior art.

Third Preferred Embodiment

The third preferred embodiment of the present invention is provided for solving the problems of the third prior art and is characterized in that the measurement is executed by continuously sweeping the parameter value when the hard disk 1 is rotated for one turn. Concretely Speaking, after writing a write signal while continuously changing the write parameter for one track, the write signal is read out as a read signal with the read parameter fixed for the track. Otherwise, after writing a write signal with a fixed write parameter for one track, the write signal is read out as a read signal while continuously changing the read parameter with respect to the track.

Figure 21:
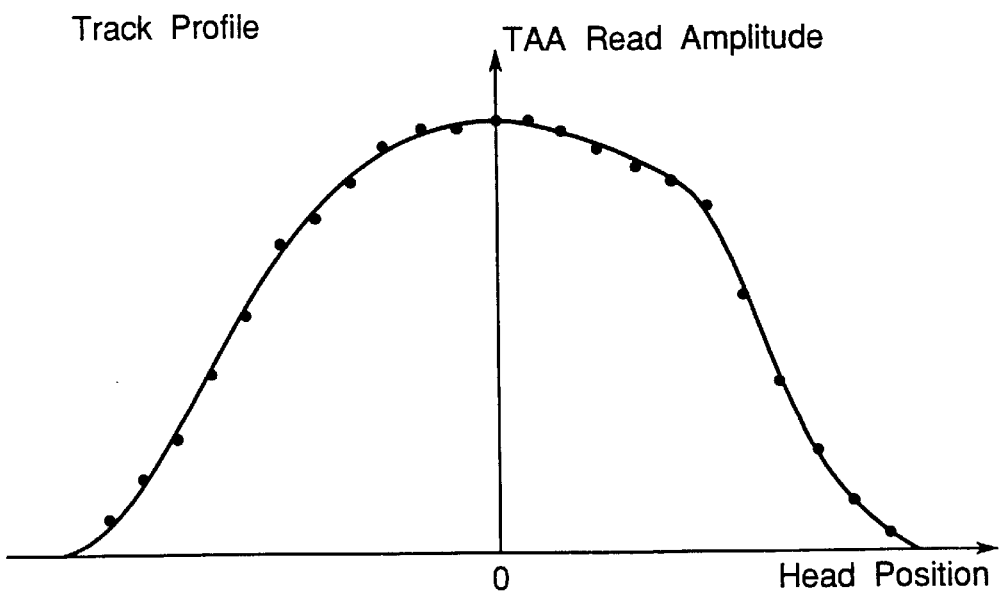
FIG. 21 is a graph of a track profile showing a TAA read amplitude relative to the head position of a prior art.

That is, according to the measurement of the third prior art described with reference to FIG. 21, the time interval for moving the head position takes a long time as compared with that for the rotation of the spindle, and therefore, the measuring method of the first preferred embodiment and the second preferred embodiment for measuring the data for one revolution through division into the sectors cannot be used. In the third preferred embodiment, a measurement of, for example, the track profile measurement, which has conventionally taken a very long time, can be executed in a shorter time by continuously sweeping the parameter value when the hard disk 1 is rotated by one turn.

Figure 22:
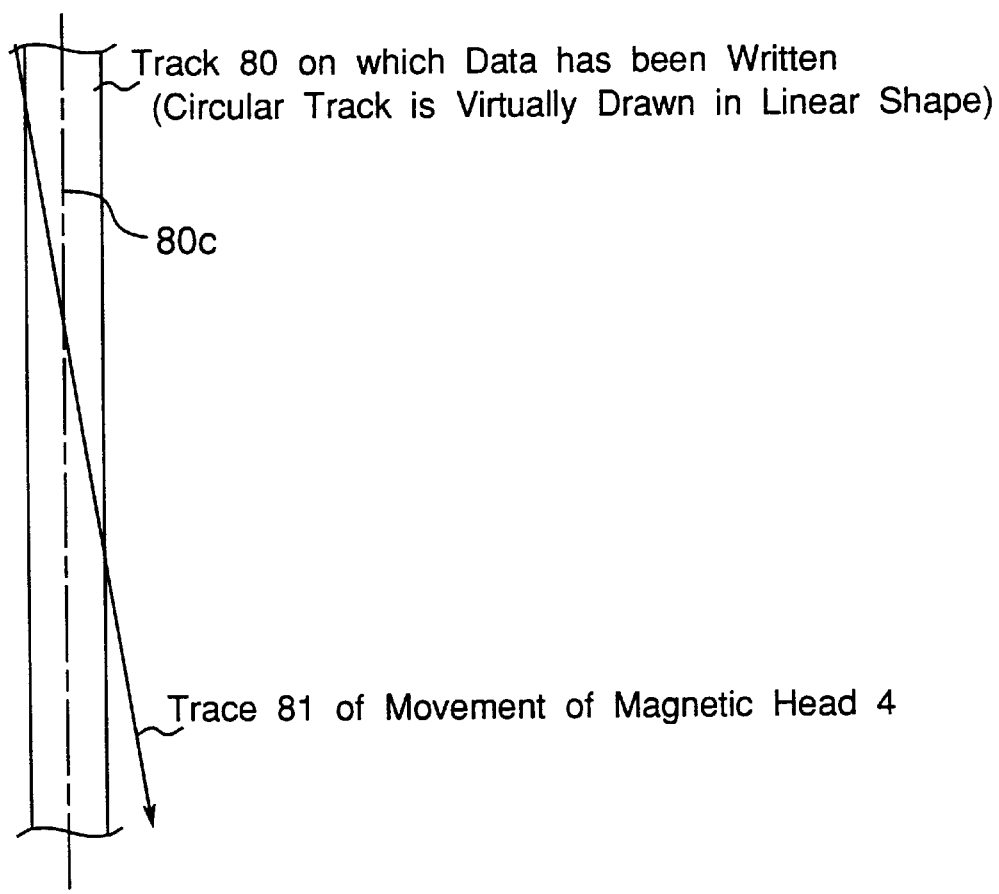
FIG. 22 is a schematic view showing a trace of the movement of a magnetic head relative to a track (a circular track is virtually drawn in a linear shape) on which data is written according to a third preferred embodiment.

For example, as shown in FIG. 22, by moving the magnetic head 4 so that the head crosses inclined to the center line 80c of a track 80 on which data has been written, the dependency of the head position and the read amplitude can be measured in a time interval for which the hard disk 1 is rotated by one turn. It is also acceptable to use a method of executing the writing while moving the magnetic head 4 in the writing stage and not moving the magnetic head 4 in the reading stage.

Figure 23A:
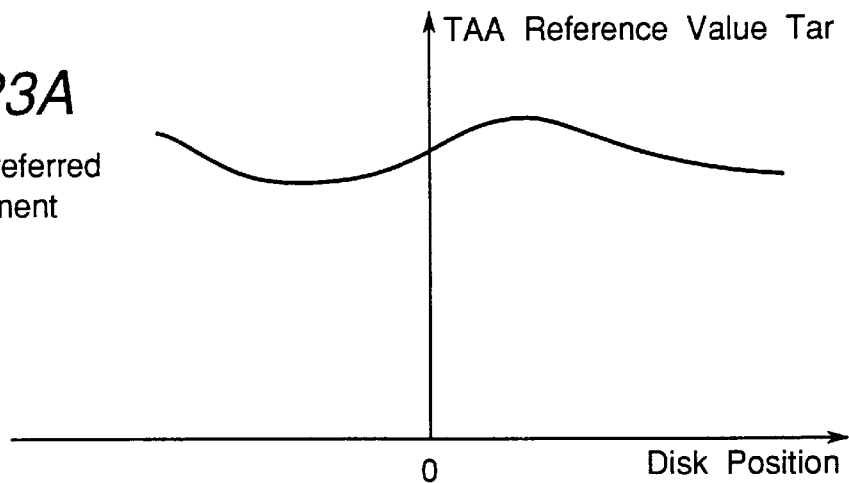
FIGS. 23A, 23B and 23C are graphs showing a TAA data compensating method of the third preferred embodiment, where
Figure 23B:
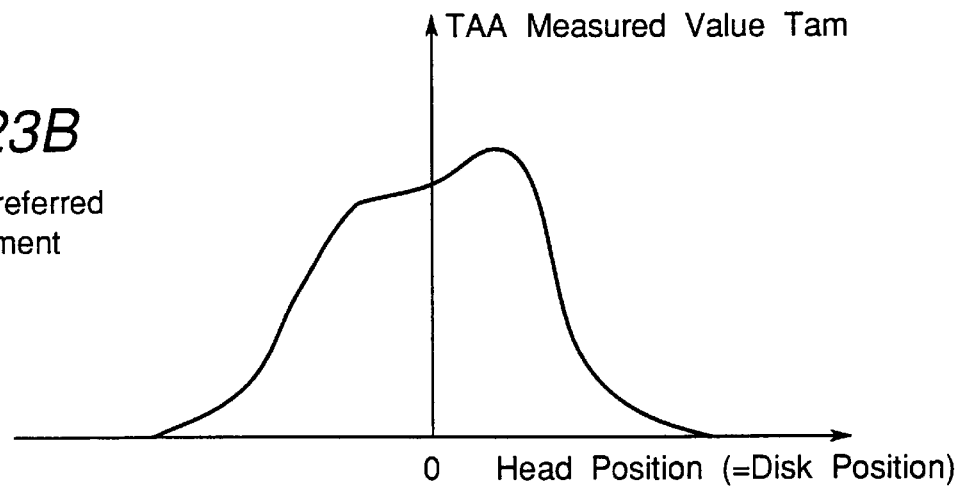

In the third preferred embodiment, in an attempt at compensating for the non-uniformity of the characteristics of the hard disk 1 in a manner similar to that of the above-mentioned case, a more correct measured value is obtained by using a measured TAA obtained by not moving the magnetic head 4 as a reference value Tar as shown in FIG. 23A, collating or checking a measured value Tam measured by moving the magnetic head 4 with the above reference value Tar and correcting the same as shown in FIG. 23B.

Figure 23C:
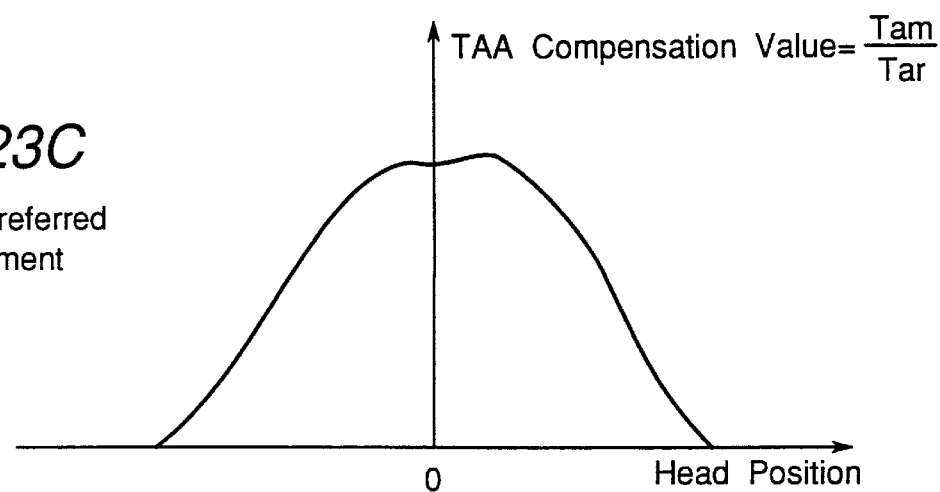

Referring to FIGS. 23A, 23B and 23C, the axis of abscissas represents the position in one revolution of the track of the hard disk 1 (referred to as a "disk position" hereinafter) and is expressed as a "head position" by making the head position with respect to the center lien 80c of the track correspond to the above-mentioned disk position. In the example shown in FIGS. 23A, 23B and 23C, a calculated value obtained by dividing the measured value Tam by the reference value Tar is used as a compensated measured value Tac. Although the division calculation is used for the correction in the third preferred embodiment, the present invention is not limited to this, and another corrective calculation formula may be used.

In the third preferred embodiment, in regard to the sweep of the parameter sweep, a continuous sweep is achieved by continuing to change the set value of the parameter in a sufficiently short time as compared with the parameter convergence time. The continuous sweep of the head position and the frequency is executed by this method.

Figure 25:
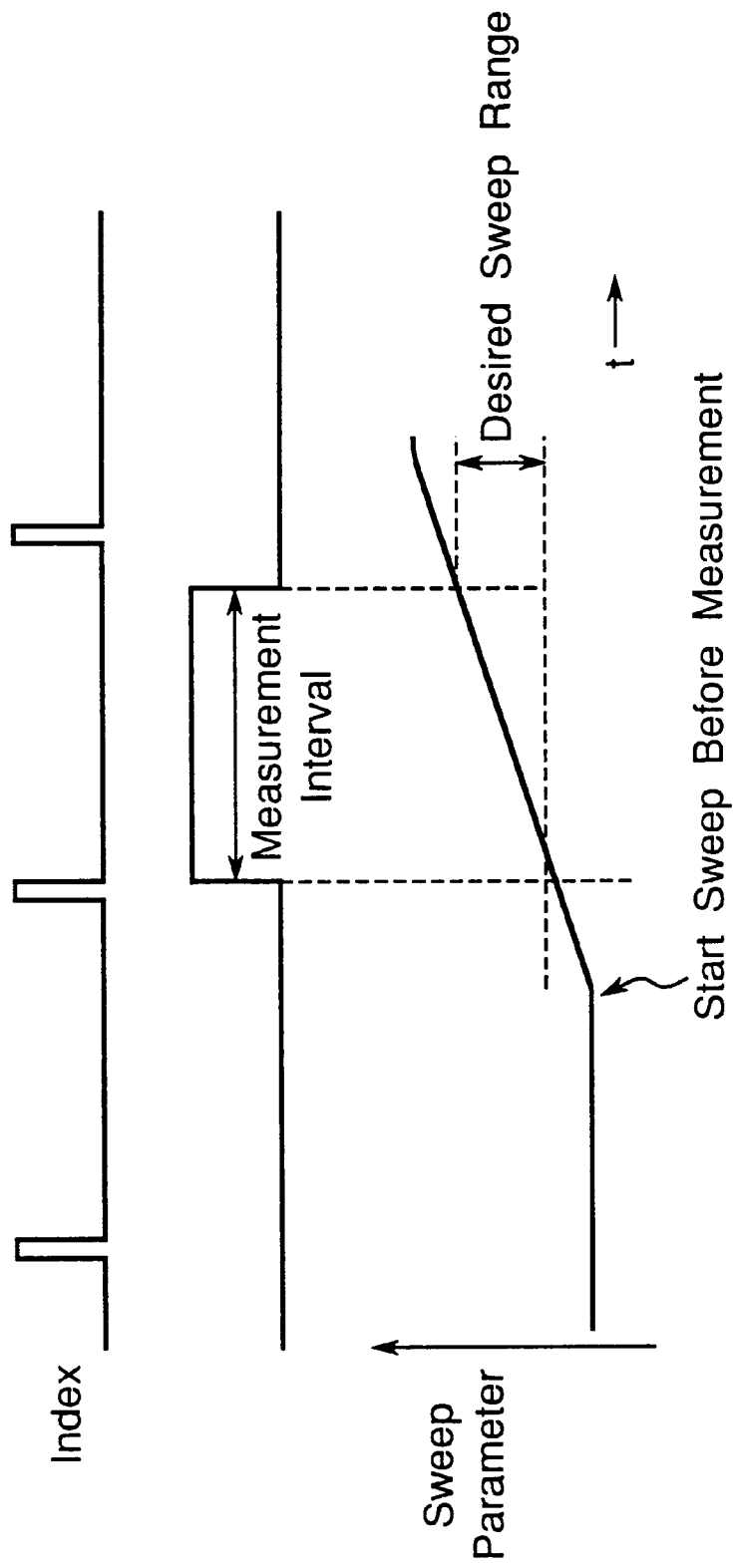
FIG. 25 is a timing chart showing a measuring method of a modified preferred embodiment.

FIG. 25 shows a further modified preferred embodiment of the parameter value sweeping method. For example, when sweeping a parameter of which the convergence time of the setting value is slower than the rotating cycle of the spindle 2, there is provided a construction in which a parameter value on the upstream side of the desired initial value is used as an initial value, and then, the sweep is started prior to the start of the measurement, so that a stabilized measurement is achieved during the measurement. With this arrangement, a more correct measurement can be achieved.

Fourth Preferred Embodiment

The fourth preferred embodiment of the present invention is characterized in that a plurality of mutually different measurement items are measured during the time interval for which the hard disk 1 is rotated by one turn. In this case, concretely speaking, by writing different write data in different sectors, a plurality of different measurements are executed during the one revolution. For example, as shown in FIG. 24, an LF (long-interval magnetization inverting data) is written into a Sector 1, an HF (short-interval magnetization inverting data) is written into a Sector 2, and then, a pseudo random signal is written into a Sector 3. Then, the TAA of the LF (long-interval magnetization inverting data) is measured in the Sector 1, the TAA of the HF (short-interval magnetization inverting data) is measured in the Sector 2, and then, a non-linear bit shift amount (NLTS) is measured in the Sector 3. That is, after writing a write signal with the write parameter of an item changed for respective sectors, the written write signal is read out by a predetermined read parameter for respective sectors, the read write signal is measured as a read signal and a measurement result of the measurement item changed for respective sectors is obtained based on the measured read signal.

The fourth preferred embodiment can be implemented by merely rewriting the reference table with the instrument construction of the first preferred embodiment or its modified preferred embodiment. Therefore, with the construction of the fourth preferred embodiment, the measurement of the performance of the hard disk 1 can be executed at a higher speed than that of the prior art.

Modified Preferred Embodiment

The above-mentioned preferred embodiments each describe the measuring apparatus for the recording unit including the recording medium of the hard disk. However, the present invention is not limited to this, and it can be applied to a measuring apparatus for use in a recording unit for measuring performance characteristics of a recording unit including a recording medium of a floppy disk, an optical disk such as CD, DVD, a magneto-optical disk (of ROM, write once type, rewriting type) or the like and components such as a head for recording a data signal on the above recording medium.

According to the preferred embodiments of the present invention, the performance characteristics of the recording medium can be measured at a higher speed than that of the prior art.

Further, when the correctively calculating means is further provided, the measured value can be properly corrected and more correct measured value can be obtained.

Further, when the statistically calculating means is further provided, statistically processing the measured value can be properly performed and more correct measured value can be obtained. Furthermore, there can be obtained calculation results of the statistical processing in which the evaluation of the variation in the calculation results thereof is influenced by the average value for respective sectors.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A measuring apparatus for use in a recording unit, for measuring performance characteristics of said recording unit including a recording medium on which one track is divided into a plurality of sectors, said measuring apparatus comprising:

writing means for writing a write signal with a write parameter;

first control means for changing said write parameter value for respective sectors;

reading means for reading out the write signal written by said writing means, with a read parameter and measuring the read-out write signal as a read signal; and second control means for controlling said read parameter so as to produce predetermined read parameter values for respective sectors.

2. A measuring apparatus for use in a recording unit, for measuring performance characteristics of said recording unit including a recording medium on which one track is divided into a plurality of sectors, said measuring apparatus comprising:

writing means for writing a write signal with a write parameter;

first control means for controlling said write parameter so to produce predetermined write parameter values for respective sectors;

reading means for reading out the write signal written by said writing means with a read parameter, and measuring the read-out write signal as a read signal; and second control means for changing said read parameter for respective sectors.

3. A measuring apparatus for use in a recording unit, for measuring performance characteristics of said recording unit including a recording medium on which one track is divided into a plurality of sectors, said measuring apparatus comprising:

first writing means for writing a write signal with a first write parameter;

first control means for controlling said first write parameter so as to produce predetermined first write parameter values for respective sectors;

first reading means for reading out the write signal written by said first writing means, with a first read parameter, and measuring the read-out write signal as a reference read signal;

second control means for controlling said first read parameter so as to produce predetermined first read parameters for respective sectors;

second writing means for writing a write signal with a second write parameter;

third control means for changing said second write parameters for respective sectors;

second reading means for reading out the write signal written by said second writing means, with a second read parameter, and measuring the read-out write signal as a measured read signal;

fourth control means for controlling said second read parameter so as to produce predetermined second read parameter values for respective sectors; and correctively calculating means for correctively calculating the measured read signal measured by said second reading means, according to a predetermined correctively calculating method based on the reference read signal measured by said first reading means, and outputting a correctively calculated measured read signal.

4. A measuring apparatus for use in a recording unit, for measuring performance characteristics of said recording unit including a recording medium on which one track is divided into a plurality of sectors, said measuring apparatus comprising:

first writing means for writing a write signal with a write parameter;

first control means for controlling said write parameter so as to produce predetermined write parameter values for respective sectors;

first reading means for reading out the write signal written by said first writing means, with a first read parameter, and measuring the read-out write signal as a reference read signal;

second control means for controlling said first read parameter so as to produce predetermined first read parameter values for respective sectors;

second reading means for reading out the write signal written by said first writing means, with a second read parameter value, and measuring the read-out write signal as a measured read signal;

third control means for changing said second read parameter for respective sectors; and correctively calculating means for correctively calculating the measured read signal measured by said second reading means, according to a predetermined correctively calculating method based on the reference read signal measured by said first reading means, and outputting a correctively calculated measured read signal.

5. A measuring apparatus for use in a recording unit, for measuring performance characteristics of said recording unit including a recording medium on which one track is divided into a plurality of sectors, said measuring apparatus comprising:

measuring means for measuring a read-out write signal as a read signal by, for respective sectors, writing a write signal and thereafter reading out a written write signal; and statistical calculating means for executing a statistical calculation on the read signal of each sector measured by said measuring means, and outputting a result of the statistical calculation, wherein said statistical calculating means executes the statistical processing calculation for respective sectors on the read signal of each sector measured by said measuring means, and outputs a result of the statistical calculation so as to prevent evaluation of a variation of the result of the statistical calculation from being influenced by an average value of each sector.

6. A measuring apparatus for use in a recording unit, for measuring performance characteristics of said recording unit including a recording medium having at least one track, said measuring apparatus comprising:

writing means for writing a write signal with a write parameter;

first control means for continuously changing said write parameter for one track;

reading means for reading-out the write signal written by said writing means, with a read parameter and measuring the read-out write signal as a read signal; and second control means for controlling said read parameter so as to produce a predetermined read parameter value.

7. The measuring apparatus as claimed in claim 6, further comprising:

wherein said first control means continuously changes said write parameter in a cycle shorter than a time required for convergence of said write parameter upon setting said write parameter to a predetermined set value.

8. The measuring apparatus as claimed in claim 6, further comprising:

means for starting a sweep process for changing said write parameter prior to the process of continuously changing said write parameter, thereby obtaining a stable parameter sweep state in the process of continuously changing said write parameter.

9. A measuring apparatus for use in a recording unit, for measuring performance characteristics of said recording unit including a recording medium having at least one track, said measuring apparatus comprising:

writing means for writing a write signal with a write parameter first control means for controlling said write parameter so as to produce a predetermined write parameter for one track;

reading means for reading out the write signal written by said writing means with a read parameter, and measuring the read-out write signal as a read signal; and second control means for continuously changing said read parameter for one track.

10. A measuring apparatus for use in a recording unit, for measuring performance characteristics of said recording unit including a recording medium having at least one track, said measuring apparatus comprising:

first writing means for writing a write signal with a first write parameter first control means for controlling said first write parameter so as to produce a predetermined fixed first write parameter value for one track;

first reading means for reading out the write signal written by said first writing means, with a first read parameter, and measuring the read-out write signal as a reference read signal;

second control means for controlling said first read parameter so as to produce a predetermined first read parameter;

second writing means for writing a write signal with a second write parameter:

third control means for continuously changing said second write parameter for one track;

second reading means for reading out the write signal written by said second writing means, with a second read parameter and measuring the read-out write signal as a measured read signal;

fourth control means for controlling said second read parameter so as to produce a predetermined second read parameter value; and correctively calculating means for correctively calculating the measured read signal measured by said second reading means, according to a predetermined correctively calculating method based on the reference read signal measured by said first reading means, and outputting a correctively calculated measured read signal.

11. A measuring apparatus for use in a recording unit, for measuring performance characteristics of said recording unit including a recording medium having at least one track, said measuring apparatus comprising:

first writing means for writing a write signal with a first write parameter;

first control means for controlling said first write parameter so as to produce a predetermined fixed first write parameter value for one track;

first reading means for reading out the write signal written by said first writing means, with a first read parameter, and measuring the read-out write signal as a reference read signal;

second control means for controlling said first read parameter so as to produce a predetermined first read parameter value;

second reading means for reading out the write signal written by said first writing means with a second read parameter, and measuring the read-out write signal as a measured read signal;

third control means for continuously changing said second read parameter for one track; and correctively calculating means for correctively calculating the measured read signal measured by said second reading means according to a predetermined correctively calculating method based on the reference read signal measured by said first reading means, and outputting a correctively calculated measured read signal.

12. A measuring apparatus for use in a recording unit, for measuring performance characteristics of said recording unit including a recording medium on which one track is divided into a plurality of sectors, said measuring apparatus comprising:

writing means for writing a write signal with write parameters of a plurality of items;

first control means for controlling said write parameters of said plurality of items so as to change individual ones of said plurality of items for respective sectors;

reading means for reading out the write signal written by said writing means, with a read parameter, and measuring the read-out write signal as a read signal; and second control means for controlling said read parameter so as to produce predetermined read parameter values for respective sectors, whereby said reading means obtains measurement results of said plurality of items changed by said first control means for respective sectors based on the measured read signal.

13. A measuring apparatus for use in a recording unit for measuring performance characteristics of said recording unit including a recording medium on which one track is divided into a plurality of sectors, said measuring apparatus comprising:

trigger generating means, in response to an index signal generated every one turn of said recording medium, for outputting or not outputting one index trigger signal, or for multiplying the index signal, generating and outputting or not outputting a plurality of sector trigger signals corresponding to the plurality of sectors; and at least one control means, in response to either the index trigger signal or the plurality of sector trigger signals outputted from said trigger generating means, for executing either one of a process of writing a write signal and a process of reading out the write signal, wherein, in response to the index signal, said trigger generating means selectively outputs or does not output either the index trigger signal or the plurality of sector trigger signals to said control means for executing said process, with reference to a predetermined reference table.

14. The measuring apparatus as claimed in claim 13, wherein said control means executes a predetermined process with reference to a reference table in which a process to be executed is preparatorily listed, in response to either one of the index signal, the index trigger signal and said sector trigger signal.

15. The measuring apparatus as claimed in claim 14, wherein at least one said control means includes first and second control means, wherein said first control means writes the write signal with a write parameter value changed for respective sectors, and wherein said second control means reads out the write signal written by said first control means with a predetermined read parameter for respective sectors, and measures the read write signal as a read signal.

16. The measuring apparatus as claimed in claim 14, wherein at least one said control means includes first and second control means, wherein said first control means writes the write signal with a predetermined write parameter for respective sectors, and wherein said second control means reads out the write signal written by said first control means, with a read parameter value changed for respective sectors, and measures the read write signal as a read signal.

17. A measuring apparatus for use in a recording unit, for measuring performance characteristics of said recording unit including a recording medium on which one track is divided into a plurality of sectors, said measuring apparatus comprising:

at least one control means having first and second input ports and switching means, wherein said switch means switches over between an index signal generated every one turn of said recording medium and a plurality of sector trigger signals generated so as to correspond to the plurality of sectors based on the index signal, and selectively outputs or does not output a switched signal, wherein the index signal is inputted to said first input port, and a signal outputted from said switch means is inputted to said second input port, and wherein said control means controls the selective switching of said switching means based on the index signal inputted to said first input port, and executes either one of a process of writing a write signal or a process of reading out the write signal based on the signal inputted to said second input port, wherein said switch means, in response to the index signal, for selectively outputting or not outputting the index trigger signal or the plurality of sector trigger signals to said control means for executing the process, with reference to a predetermined reference table.

* * * * *